United States Patent
Herath

(10) Patent No.: US 12,423,107 B2
(45) Date of Patent: Sep. 23, 2025

(54) APPARATUS AND METHOD

(71) Applicant: Arm Limited, Cambridge (GB)

(72) Inventor: Herath Mudiyanselage Isuru Prasenajith Herath, Fulbourn (GB)

(73) Assignee: Arm Limited, Cambridge (GB)

( * ) Notice: Subject to any disclaimer, the term of this patent is extended or adjusted under 35 U.S.C. 154(b) by 43 days.

(21) Appl. No.: 18/442,370

(22) Filed: Feb. 15, 2024

(65) Prior Publication Data

US 2025/0265089 A1 Aug. 21, 2025

(51) Int. Cl.
*G06F 9/30* (2018.01)
*G06F 9/38* (2018.01)

(52) U.S. Cl.
CPC ........ *G06F 9/3812* (2013.01); *G06F 9/30145* (2013.01); *G06F 9/30181* (2013.01); *G06F 9/3814* (2013.01); *G06F 9/3853* (2013.01)

(58) Field of Classification Search
None
See application file for complete search history.

(56) References Cited

U.S. PATENT DOCUMENTS

| | | | |
|---|---|---|---|
| 10,176,104 B2* | 1/2019 | Kudaravalli | G06F 9/30072 |
| 10,579,389 B2* | 3/2020 | Caulfield | G06F 9/3802 |
| 11,416,252 B2* | 8/2022 | Vasekin | G06F 9/3867 |
| 2004/0128483 A1* | 7/2004 | Grochowski | G06F 9/30181 |
| | | | 712/217 |
| 2017/0123808 A1* | 5/2017 | Caulfield | G06F 9/3836 |
| 2018/0129501 A1* | 5/2018 | Levison | G06F 9/3802 |
| 2019/0196832 A1* | 6/2019 | Vasekin | G06F 9/30181 |

OTHER PUBLICATIONS

U.S. Appl. No. 18/442,448, filed Feb. 15, 2024, HERATH, Atty. Dkt. 550-3119.

* cited by examiner

*Primary Examiner* — Corey S Faherty
(74) *Attorney, Agent, or Firm* — NIXON & VANDERHYE P.C.

(57) ABSTRACT

Apparatus comprises processing circuitry comprising a processing pipeline to perform data processing operations in response to instructions received as successive fetch groups of instructions, the processing pipeline comprising a plurality of successive pipeline stages; indicator circuitry to associate an indication with instructions for handling by the processing circuitry, the indication associated with a given instruction indicating whether the given instruction is a fusible instruction; and instruction fusing circuitry, responsive to the indications associated with instructions at two or more of the plurality of pipeline stages, to selectively perform a fusing operation to fuse a set of instructions at the two or more pipeline stages to generate a respective fused instruction, in which the respective indications associated with each of the set of instructions indicate that the set of instructions are fusible instructions.

20 Claims, 18 Drawing Sheets

APPARATUS AND METHOD

BACKGROUND

Technical Field

The present technique relates to the field of apparatus and methods.

Technical Background

Data processing circuitry typically executes program instructions. It has been proposed to perform a so-called fusing operation so as to fuse two or more instructions into a single fused instruction for execution. This technique has been proposed in respect of a set of instructions of a similar or compatible type and which are available together (for example at an instruction decoding stage, with the set of instructions forming part of a common instruction fetch group of instructions) for fusion to take place before execution.

Fused instructions of this nature can be executed either by the processing circuitry itself or in other examples can be communicated to so-called coprocessor circuitry for execution.

SUMMARY

At least some examples of the present technique provide an apparatus comprising:
processing circuitry comprising a processing pipeline to perform data processing operations in response to instructions received as successive fetch groups of instructions, the processing pipeline comprising a plurality of successive pipeline stages;
indicator circuitry to associate an indication with instructions for handling by the processing circuitry, the indication associated with a given instruction indicating whether the given instruction is a fusible instruction; and
instruction fusing circuitry, responsive to the indications associated with instructions at two or more of the plurality of pipeline stages, to selectively perform a fusing operation to fuse a set of instructions at the two or more pipeline stages to generate a respective fused instruction, in which the respective indications associated with each of the set of instructions indicate that the set of instructions are fusible instructions.

At least some examples of the present technique provide a system comprising:
the apparatus described above, implemented in at least one packaged chip;
at least one system component; and
a board,
wherein the at least one packaged chip and the at least one system component are assembled on the board.

At least some examples of the present technique provide a chip-containing product comprising the system described above wherein the system is assembled on a further board with at least one other product component.

At least some examples of the present technique provide a non-transitory computer-readable medium to store computer-readable code for fabrication of the apparatus described above.

At least some examples of the present technique provide a method comprising:
performing data processing operations using a processing pipeline in response to instructions received as successive fetch groups of instructions, the processing pipeline comprising a plurality of successive pipeline stages;
associating an indication with instructions for handling by the performing step, the indication associated with a given instruction indicating whether the given instruction is a fusible instruction; and
in response to the indications associated with instructions at two or more of the plurality of pipeline stages, selectively fusing a set of instructions at the two or more pipeline stages to generate a respective fused instruction, in which the respective indications associated with each of the set of instructions indicate that the set of instructions are fusible instructions.

Further aspects, features and advantages of the present technique will be apparent from the following description of examples, which is to be read in conjunction with the accompanying drawings.

DESCRIPTION OF EXAMPLES

Figure 1:
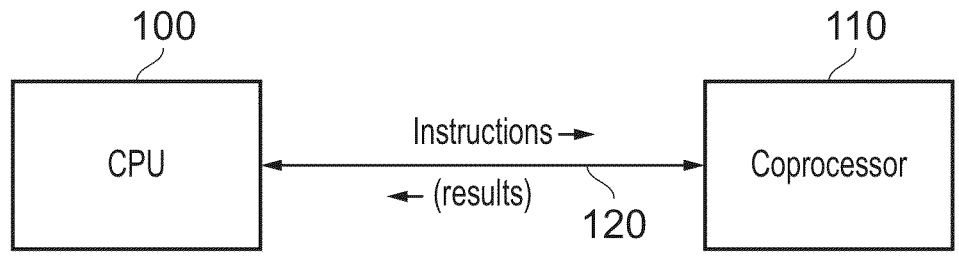
FIG. 1 schematically illustrates an example system of a processor and a coprocessor.

FIG. 1 schematically illustrates an example system of a processor or CPU (central processing unit) 100 connected to and/or associated with a coprocessor 110. Note that at least some example arrangements are applicable to a processor and coprocessor system, although other examples will be described below which do not require the use of a coprocessor.

The processor 100 is configured to execute instructions, whether this is in the context of so-called in-order or so-called out-of-order processing. The processor 100 can selectively pass instructions to the coprocessor 110 for execution. In general, and subject to discussion of FIGS. 18 to 22 below, the instructions passed to the coprocessor 110 by the processor 100 can be any one or more of:

- instructions which the processor is incapable of executing but which the coprocessor is capable of executing
- instructions which the processor 100 could in principle execute but which the coprocessor is capable of executing more efficiently (for example, mathematical functions which the coprocessor is particularly configured)
- instructions which both the processor and the coprocessor are capable of executing with similar efficiency, but which are passed to the coprocessor to relieve a processing load at the processor With the exception of some examples discussed with reference to FIGS. 18 to 22 below, it is assumed for the purposes of this description that any instructions passed to the coprocessor 110 by the processor 100 are at least capable of execution by the coprocessor 110.

The processor 100 provides instructions to the coprocessor by a communication path 120, examples of which will be discussed below. The results of execution of those instructions by the coprocessor 110 may be returned at least in part to the processor 100, for example by the communication path 120. Alternatively, the instructions executed by the coprocessor 110 may be implemented directly by the coprocessor 110, for example by the coprocessor moving data from one memory location to another, or by the coprocessor performing a calculation and storing the result in a particular memory location. In these latter examples, the coprocessor 110 may simply perform the required function without further reference to the processor, or alternatively the coprocessor may return an indication to the processor 100 that the required function has been performed.

In some examples, the processor 100 may be a scalar processor and the coprocessor 110 may be a vector and/or matrix processor. Here, vector or matrix processing operations involve applying a single processing instruction to data items of a data vector having a plurality of data items at respective positions in the data vector or to data items of a data matrix having a multi-dimensional array of data items. By contrast, scalar processing operates on, effectively, single data items rather than on data vectors or matrices. Vector or matrix processing can be useful in instances where processing operations are carried out on many different instances of the data to be processed. In a vector or matrix processing arrangement, a single instruction can be applied to multiple data items at the same time. This can improve the efficiency and throughput of data processing compared to scalar processing.

In other examples, the processor 100 may be a vector processor and the coprocessor 110 may be a matrix processor.

In other examples, the processor 100 may be a vector processor and the coprocessor 110 may be a vector processor.

These examples are not limiting and other arrangements or permutations of respective capabilities of the processor 100 and the coprocessor 110 may be provided.

Figure 2:
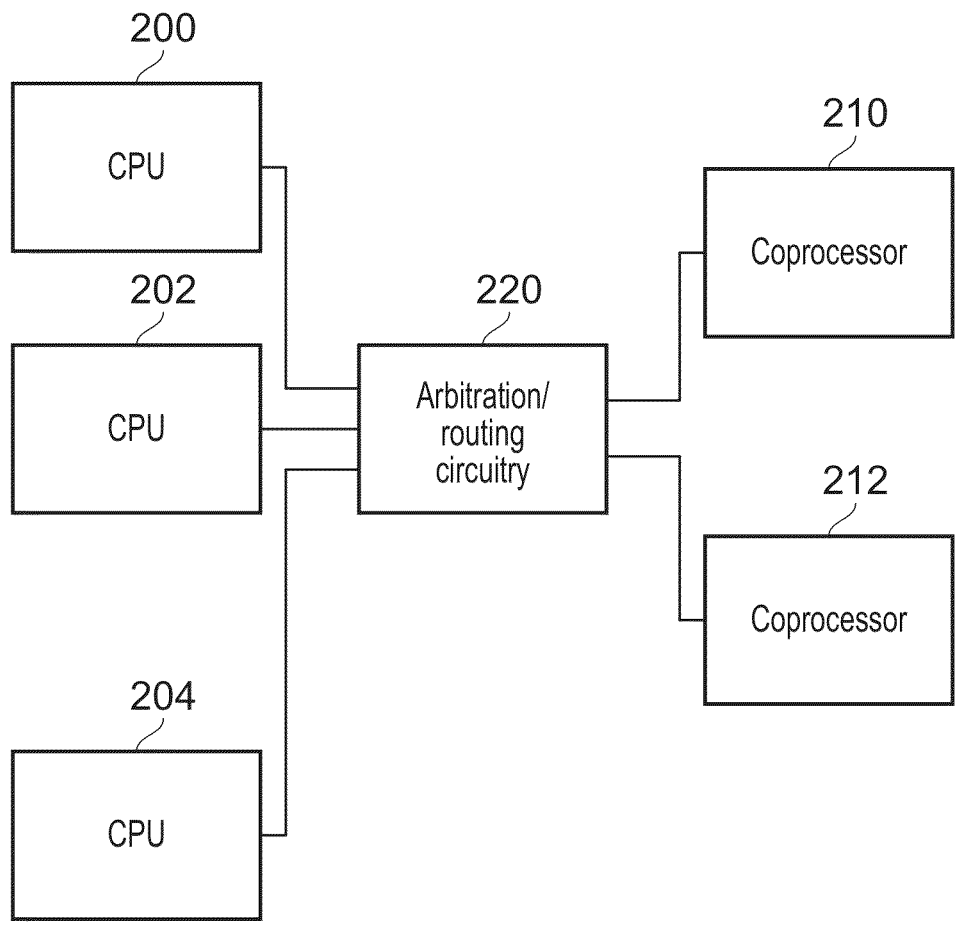
FIGS. 2 and 3 schematically illustrates further example systems of multiple processors and multiple coprocessors.

FIG. 2 schematically illustrates another example arrangement having a plurality of processors 200, 202, 204, connected to a plurality of coprocessors 210, 212 via arbitration/routing circuitry 220. Here, the respective numbers of processors (three being shown in FIG. 2) and coprocessors (two being shown in FIG. 2) are purely by way of schematic example and different respective numbers could be employed.

In operation, at least in principle any processor 200, 202, 204 can request the arbitration/routing circuitry 220 to give temporary control of a given coprocessor to that processor. When the arbitration/routing circuitry 220 grants such temporary control, the processor to which control has been granted may communicate instructions to the temporarily controlled coprocessor for execution by that coprocessor. Subsequently, the processor can indicate to the arbitration/routing circuitry 220 that the processor is releasing control of that coprocessor, or the arbitration/routing circuitry 220 can itself terminate the control granted to that processor and potentially allocate control to a different processor.

In these examples, the arbitration/routing circuitry 220 can provide an example of the communication path 120.

In the schematic examples of FIG. 2, the processors 200, 202, 204 may have the same or different respective processing capabilities. Similarly, the coprocessors 210, 212 may have the same or different respective processing capabilities. In at least some examples, a processor may select a given coprocessor to which instructions are to be communicated based upon the processing capabilities of that given coprocessor. For example, if the coprocessor 210 is a matrix processor while the coprocessor 212 and indeed the processors 200, 202, 204 do not have matrix processing capabilities, then the processors 200, 202, 204 may be arranged so that when they receive a matrix instruction for execution, they requested temporary control of the coprocessor 210 rather than the coprocessor 212 to handle that matrix instruction. On the other hand, in the case of instructions for which both of the coprocessors 210, 212 have execution capability, a processor 200, 202, 204 may select either of the coprocessors 210, 212.

In other examples, the selection of a coprocessor from the plurality of available coprocessors may be handled at least in part by the arbitration/routing circuitry in response to data from the requesting processor indicating the type of task required of the coprocessor and/or data indicating respective capabilities of each of the coprocessors.

Figure 3:
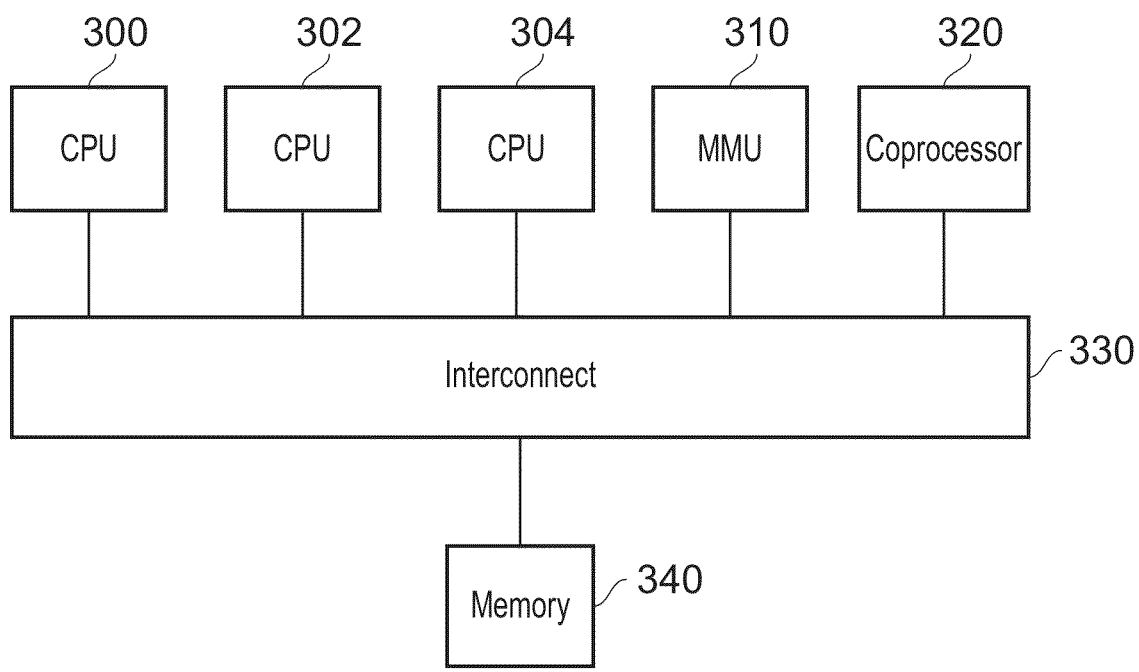

These or other examples may be implemented using so-called interconnect circuitry. FIG. 3 schematically illustrates a further example of an apparatus comprising one or more processors 300, 302, 304, a memory management unit (MMU) 310 and a coprocessor 320 (just one being shown but it will be appreciated that a plurality of coprocessors may be provided), all connected to an interconnect 330 to which a main memory sub-system 340 is also connected.

In operation, each processor can execute program instructions, which may be, for example, loaded from the memory sub-system 340 and optionally stored in one or more local caches (not shown in FIG. 3). A processor can also forward instructions for execution by the co-processor 320.

In respect of all of these examples of FIGS. 1-3, techniques for selectively providing local execution (at the processor or at a processor of a plurality of processors) and remote execution (at the coprocessor or at a coprocessor of a plurality of coprocessors) will be discussed below.

Figure 4:
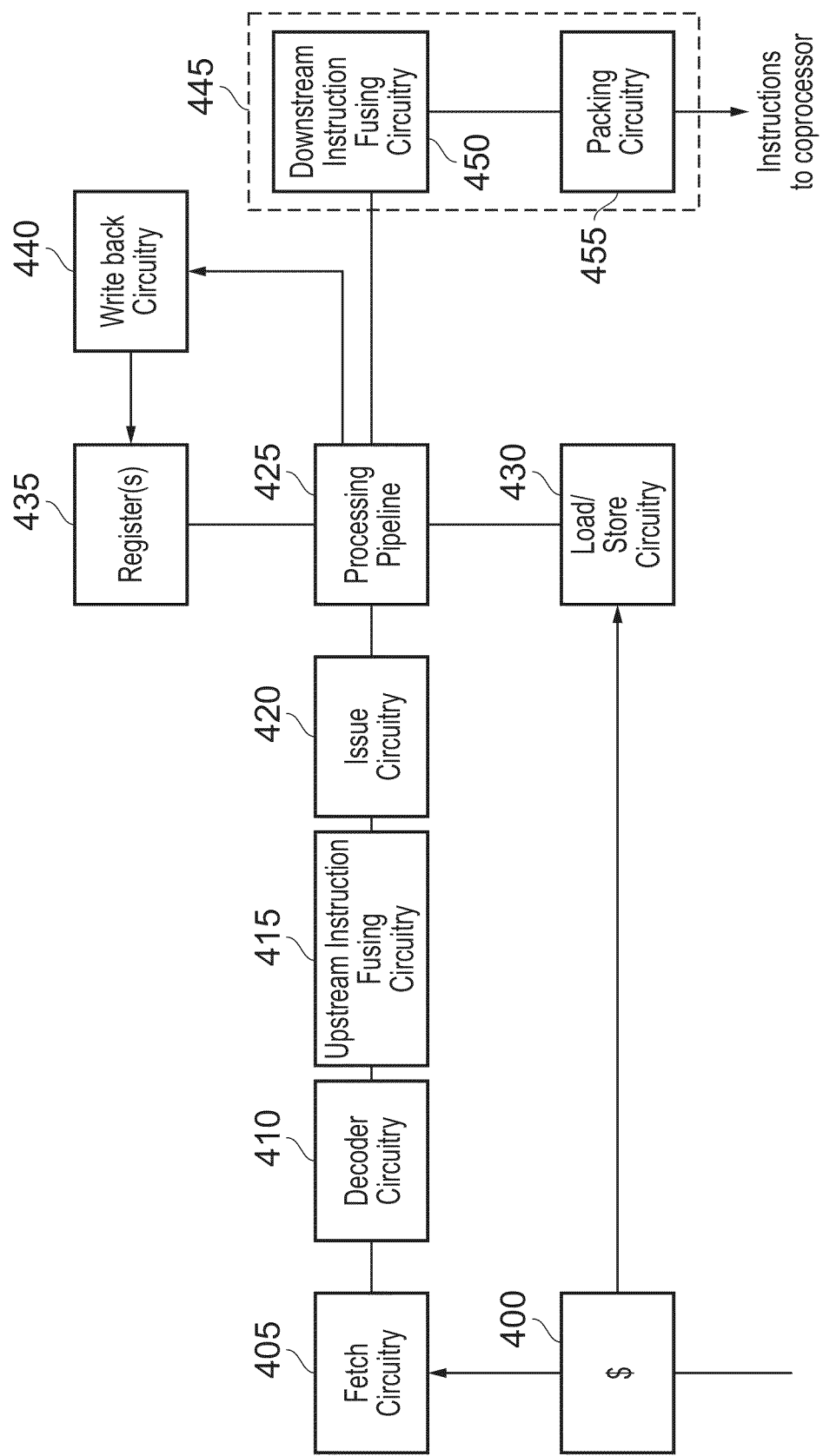
FIG. 4 schematically illustrates a processor.

FIG. 4 schematically illustrates a processor, for example any of the processors 100, 200, 202, 204, 300, 302 or 304 mentioned above.

Cache ("$") circuitry 400 interfaces with a memory system such as the memory system 340 of FIG. 3 via the interconnect circuitry 330 or with a memory system (not shown) associated with the processors of FIGS. 1 and 2. The cache circuitry 400 may comprise one or more instruction caches and one or more data caches so as to provide a more localised cache of processing instructions for execution and a more localised cache of data to be retrieved from or stored to the memory system.

Fetch circuitry 405 fetches program instructions from the memory system via the cache circuitry and provides fetched program instructions to decoder circuitry 410. In example arrangements, the fetch circuitry may fetch the instructions as so-called "fetch groups" representing a plurality of instructions contained within a single cache "line" (a unit of storage handled by the cache circuitry 400). For example, a fetch group may comprise four program instructions at adjacent addresses within the memory system. A fetch group of instructions are therefore available at the same time and proceed through the various processing stages shown in FIG. 4 together.

The decoder circuitry 410 decodes the fetched program instructions and generates control signals to control execution of those program instructions.

A stage of so-called instruction fusion may be associated with the decoder circuitry (and is shown schematically in FIG. 4 as upstream instruction fusing circuitry 415). Here, the term "upstream" refers to a relationship between the circuitry 415 and a processing pipeline 425 to be described below, in that in this example the circuitry 415 is before or upstream of the processing pipeline 425, or at least upstream of a downstream instruction fusing circuitry 450 to be described below. However, the term is not limiting on the actual position of the circuitry 415 in the overall arrangement of FIG. 4. Instruction fusion will be discussed further below.

Issue circuitry 420 issues program instructions for execution to a processing pipeline 425 which will be described further with reference to FIG. 8 and which executes the program instructions with reference to load/store circuitry 430 which controls the loading of data required for execution of a given program instruction from the main memory (via the cache circuitry 400) and the storage of data representing the results of execution of a program instruction back to the main memory (again, via the cache circuitry 400).

As part of processing a given program instruction, the processing pipeline 425 may make reference to one or more registers 435 and may write data to those registers using writeback circuitry 440.

FIG. 4 therefore provides an example of processing circuitry comprising a processing pipeline (such as the processing pipeline 425) to perform data processing operations in response to instructions received as successive fetch groups of instructions, the processing pipeline comprising a plurality of successive pipeline stages.

In some examples, for example in the case of a so-called in-order processor, each pipeline stage may handle instructions dependent upon a respective fetch group of instructions. However, in other examples, for example in at least some instances of a so-called out-of-order processor, this constraint may not apply.

FIG. 4 also discloses an example of decoder circuitry 410 to decode a first subset of instructions for execution by the processing circuitry; and communication circuitry (which in this example may be embodied as the packing circuitry 455) to selectively communicate a second subset of instructions, different to the first subset of instructions, to second processing circuitry for execution.

FIG. 4 also shows circuitry 445 to provide instructions to one of the coprocessors for execution. In this example, the circuitry 445 also comprises downstream instruction fusing circuitry 450 along with packing circuitry 455. Once again, the term "downstream" is not necessarily limiting but represents a location within the arrangement of FIG. 4 at the end of or after the processing pipeline 425, or at least downstream of the upstream instruction fusing circuitry 415. This stage of instruction fusion and the packing process will be described further below.

As mentioned above, it is noted that the processor of FIG. 4 may be an in-order or an out-of-order processor.

Processors such as the processor of FIG. 4 or indeed any of the coprocessors shown in FIGS. 1 to 3 may support so-called instruction fusion. A "fusible group" of instructions may be more efficiently handled as a fused instruction rather than as individual instructions.

Typically, however, such a fusible group of instructions must represent instructions available at the same time, which is to say in the same fetch group.

The upstream instruction fusing circuitry 415 is an example of circuitry to handle instruction fusion of instructions within a fetch group of instructions. Although drawn separately, the upstream instruction fusing circuitry 415 may form part of the decoder circuitry or at least may operate in a common clock cycle with the operation of the decoder circuitry. The upstream instruction fusing circuitry 415 detects the presence of a fusible group of instructions within a fetch group and, when such a fusible group is present, performs instruction fusion with respect to that fusible group so as to generate a fused instruction from the fusible group. Note that there may in fact be multiple fusible groups present within a fetch group (for example, two fusible groups of two instructions each may be present within a fetch group of four instructions), in which case the instruction fusing circuitry may perform more than one fusing operation in respect of a given fetch group.

The instruction fusing circuitry performs a further function in the present examples, which is to associate an indicator with each instruction (whether a fused instruction or an unfused instruction) passed to the issue circuitry. The indicator serves to indicate an instruction fusion category, which is an indication of a type of instruction with which that instruction could have been fused. In other words, the instruction fusion category can indicate that if that instruction had been present in a fetch group with another instruction of the same category, a fusion operation with that other instruction could in principle have taken place.

The fusing of instructions can apply to execution by the processor of FIG. 4 itself or to execution by a coprocessor. In general, and as discussed further below, in the processor of FIG. 4 all instructions proceed through the processing pipeline 425. Instructions to be executed by the processor itself are executed by the processing pipeline, whereas instructions to be executed by a coprocessor simply progress through the processing pipeline to emerge at the end of the processing pipeline for communication to the relevant coprocessor.

As a simplified example of instruction fusion, consider two move ("MOV") instructions appearing in the same fetch group:

MOV (move parameters A)

MOV (move parameters B)

Assuming the two sets of parameters are appropriately related to allow fusion (examples being discussed below) the instruction fusing circuitry may fuse these two instructions into a fused MOV instruction referencing both sets of move parameters:

MOV (move parameters A) (move parameters B)

In some examples, such a fused instruction may be executed by the processor itself. However, in other examples, the fused instruction may be executed by a coprocessor. As a particular example of this latter arrangement, the coprocessor may for example be a matrix processor (where the processor does not have matrix processing capabilities) and the two sets of move parameters may reference matrix registers, in this example representing a common source register but different destination registers:

MOV z17.D, z16.D
MOV z21.D, z16.D

Where these two instructions are available in the same fetch group they may be fused into a fused MOV instruction referencing both sets of parameters which progresses through the processing pipeline 425 without being executed and is then communicated to the relevant coprocessor for execution.

In these examples, the instructions to be fused are present within the same fetch group, which is to say that they are available to the upstream instruction fusing circuitry 415 in the same clock cycle. A feature of this arrangement is that if fusion candidate instructions (which would represent a fusible group if they were present in the same fetch group) arrive at the upstream instruction fusing circuitry 415 in different respective fetch groups, they are not able to be fused by the upstream instruction fusing circuitry 415. This is an example, in the context of fetch groups containing four instructions, of instructions present into respective fetch groups which, if they have been present in the same fetch group, could have been fused by the upstream instruction fusing circuitry 415:

0x7ceaac: MOV z17.D, z16.D
0x7ceab0: MOV z21.D, z16.D

In this example, the first instruction as listed is the final instruction of a first fetch group and the second instruction as listed is the first instruction in a next fetch group. Accordingly, in the absence of other techniques to be described below, the opportunity to gain potential increased efficiencies in the communication to and execution by the coprocessor is not available for these two instructions.

Some example embodiments can address this matter by providing:

(i) circuitry to associate a fusion category indicator with each instruction to be handled by the processing pipeline 425; and (ii) an instruction fusing stage associated with communication of instructions to a coprocessor, arranged to be capable of fusing instructions from within different fetch groups according to the fusion category indicators associated with those instructions. For example, this may be embodied by the downstream instruction fusing circuitry 450 of FIG. 4, for example being disposed at a final stage of the processing pipeline 425.

In the example drawn in FIG. 4, the circuitry (i) to associate a fusion category indicator is embodied by the upstream instruction fusing circuitry 415. Note, however, that the present techniques do not require that a stage of instruction fusion is provided before the processing pipeline. In some examples, the upstream instruction fusing circuitry 415 could simply provide the association of the fusion category indicator without itself providing any fusing function. However, in the examples to be discussed, instruction fusing may take place in one of two stages, namely at the upstream instruction fusing circuitry 415 in the case of instructions within a common fetch group and at the downstream instruction fusing circuitry 450 in the case of instructions originating within different fetch groups.

Note that in some examples, such as those to be discussed below, an indicator is associated with an instruction only when it is potentially fusible, such that the absence of an indicator represents a "non-fusible" situation. In other examples, though, a null indicator could be used for this representation, so that every instruction has an indicator attached but some of these are potentially null indicators to represent that it is non-fusible.

The upstream instruction fusing circuitry 415 therefore provides an example of indicator circuitry to associate an indication with instructions for handling by the processing circuitry, the indication associated with a given instruction indicating whether the given instruction is a fusible instruction. In these examples, the indication circuitry is configured to detect an instruction category; the indication associated with the given instruction by the indicator circuitry is configured to indicate the instruction category of the given instruction; and as described below the downstream instruction fusing circuitry 450 is configured to fuse a set of instructions having the same instruction category.

Note that this implies that the functionality of the circuitry referred to as the upstream instruction fusing circuitry 450 in at least some examples involving late fusion may be either: (i) fuse instructions which are in the same fetch group and apply an indicator for use by downstream fusing techniques to be discussed; or (ii) simply apply an indicator for use by downstream fusing techniques to be discussed.

Here are some examples of fusion categories which may be associated with instructions by associating a respective indicator with each such instruction. These example categories relate to the MOV instruction purely by way of example, but it will be appreciated that other instructions may be capable of fusion and that corresponding fusion categories may be established and associated with such instructions.

Category A: same source, consecutive destinations:

MOV z0.S,#0
MOV z1.S,#0
MOV z2.S,#0
MOV z3.S,#0

Category B: same source, different destinations.

MOV z17.D,z16.D
MOV z21.D,z16.D
MOV z14.D,z16.D
MOV z26.D,z16.D
MOV z15.D,z16.D
MOV z24.D,z16.D

Category C: consecutive sources, non-consecutive destinations.

MOV z17.S,p4/M,ZA2V.S [w12,0]
MOV z16.S,p4/M,ZA3V.S [w12,0]

Category D: consecutive sources, non-consecutive destinations (non-consecutive PCs, which is to say with an intervening different instruction—in this case an ST1 W store instruction)

MOV z17.S,p4/M,ZA2V.S [w12,1]←fusion candidate
ST1 W {ZA3V.S [w12,1]},p0, [x27,x11,LSL #2]
MOV z16.S,p4/M,ZA3V.S [w12,1]←fusion candidate In other examples, possible fusion candidates, which may in principle be non-consecutive instructions as shown in the Program Counter (PC). Particular examples are given below under categories F to H. Note that in the case of consecutive instructions in an example arrangement, the last digit of the PC would rotate as 0→4→8→c from one instruction to a next instruction.

Category E: One source register is also used as a destination, which has the effect of reducing the total number of registers required to be specified by the fused instruction.
Category E_1 (the fused instruction defines 4 registers rather than 6)
    0x81600198:FADD z10.S,z10.S,z11.S
    0x8160019c:FADD z12.S,z12.S,z13.S
    (FADD is a floating point addition operation)
Category E_2 (the fused instruction defines 6 registers rather than 8)
    0x81600168:FMUL z4.D,p0/M,z4.D,z6.D
    0x8160016c:FMUL z5.D,p1/M,z5.D,z7.D
    0x81600170:FMUL z4.D,p0/M,z4.D,z0.D
    0x81600174:FMUL z5.D,p1/M,z5.D,z1.D
    (FMUL is a floating point multiplication operation)
Category F: The destination of the first instruction is used as a source of the second. In the example shown, this is the Z4 register.
    0x81600168:FSUB z4.D,z2.D,z0.D
    0x81600170:FSUB z4.D,z20.D,z4.D
    (FSUB is a floating point subtraction operation)
In the example cases below there are two other instructions in between the fusion candidates.
Category G: Continuous destinations and sources
    0x816001a0:ADD z10.S,z10.S,z18.S
    0x816001ac:ADD z11.S,z11.S,z19.S
    0x816001b8:ADD z12.S,z12.S,z20.S
    (ADD is an addition operation)
Category H: Continuous destinations and sources
    0x8160019c:AND z18.D,z14.D,z10.D
    0x816001a8:AND z19.D,z15.D,z11.D
    0x816001b4:AND z20.D,z16.D,z12.D
    0x816001c0:AND z21.D,z17.D,z13.D
    (AND is a logical AND combination operation)

As mentioned above, in the present examples, the upstream instruction fusing circuitry 415 performs two functions, namely the fusion of fusible instructions within a common fetch group and the tagging (or associating with an indicator representing a fusion category) of fused and unfused instructions provided to the processing pipeline 425 (whether for execution by the processing pipeline or for execution by a coprocessor). This functionality does not have to be provided by the upstream instruction fusing circuitry 415 and could instead be provided, for example, by the decoder circuitry 410, the issue circuitry 420 or other circuitry not shown within the path to the processing pipeline 425. And as mentioned above, it is not necessarily a requirement that a stage of instruction fusing of instructions within a common fetch group is provided before (upstream of) the processing pipeline 425, but in the present examples such a stage is provided by the upstream instruction fusing circuitry 415.

In some examples, considering the downstream instruction fusing circuitry 450 as a "first" such circuitry, the upstream instruction fusing circuitry 415 could be considered as second instruction fusing circuitry to selectively fuse two or more instructions from the same fetch group of instructions; in which the indicator circuitry is configured to associate the indication with fused instructions generated by the upstream instruction fusing circuitry 415; and the downstream instruction fusing circuitry 450 is configured to selectively fuse a set of instructions for which one or more instructions in the set of instructions are fused instructions generated by the upstream instruction fusing circuitry 415.

The downstream instruction fusing circuitry 450 performs a further instruction fusing operation in respect of instructions originating in different fetch groups, which will be referred to as "late" instruction fusion and which will be described below.

Figure 5:
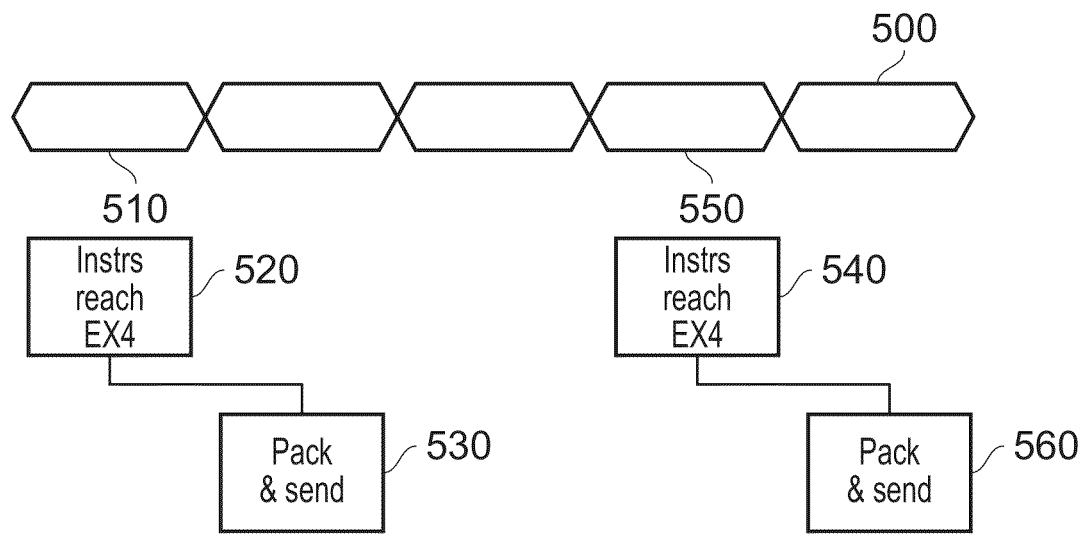
FIG. 5 schematically illustrates an example of instruction packing.
Figure 6:
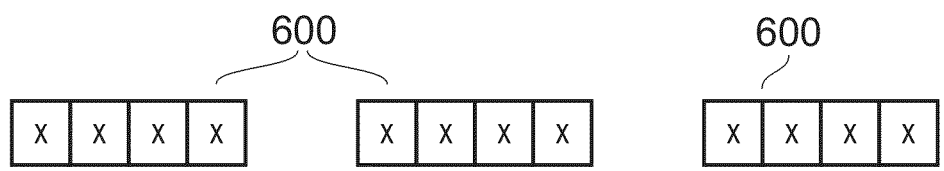
FIG. 6 schematically illustrates packed instructions.

FIGS. 5 and 6 relates to "packing" of instructions and the communication of the packed instructions to a coprocessor. For example, this functionality may be performed by the packing circuitry 455 of FIG. 4 and the description of FIGS. 5 and 6 is simply of the packing process independent of any "late" instruction fusion, which process will be described separately below.

FIG. 5 includes a representation of successive clock cycles 500 progressing from left to right as drawn.

At an example clock cycle 510, one or more instructions for communication to the relevant coprocessor arrive at a final stage (represented schematically by a stage "EX4") of the processing pipeline 425 is indicated by a step 520. At a next clock cycle those instructions are packed and sent to the coprocessor at a step 530. A similar process occurs in respect of instructions arriving at EX4 (540) at a clock cycle 550, with these instructions being packed and sent at a next clock cycle in a step 560.

The packing process performed by the packing circuitry 455 relates only to those instructions to be communicated to the relevant coprocessor. Instructions which have been fully executed by the processing pipeline 425 are not packed for communication to the coprocessor. The packing circuitry represents an example of communication circuitry configured to selectively communicate instructions at a final pipeline stage of the processing pipeline and instructions fused by the downstream instruction fusing circuitry 450.

FIG. 6 schematically represents a packing format for communication of instructions from the packing circuitry 455 to the coprocessor, in which successive groups 600 of up to the number of instructions capable of being represented by a single fetch group are communicated. Each entry indicated by an "X" is capable of being encoded to represent an unfused or a fused instruction.

Figure 7:
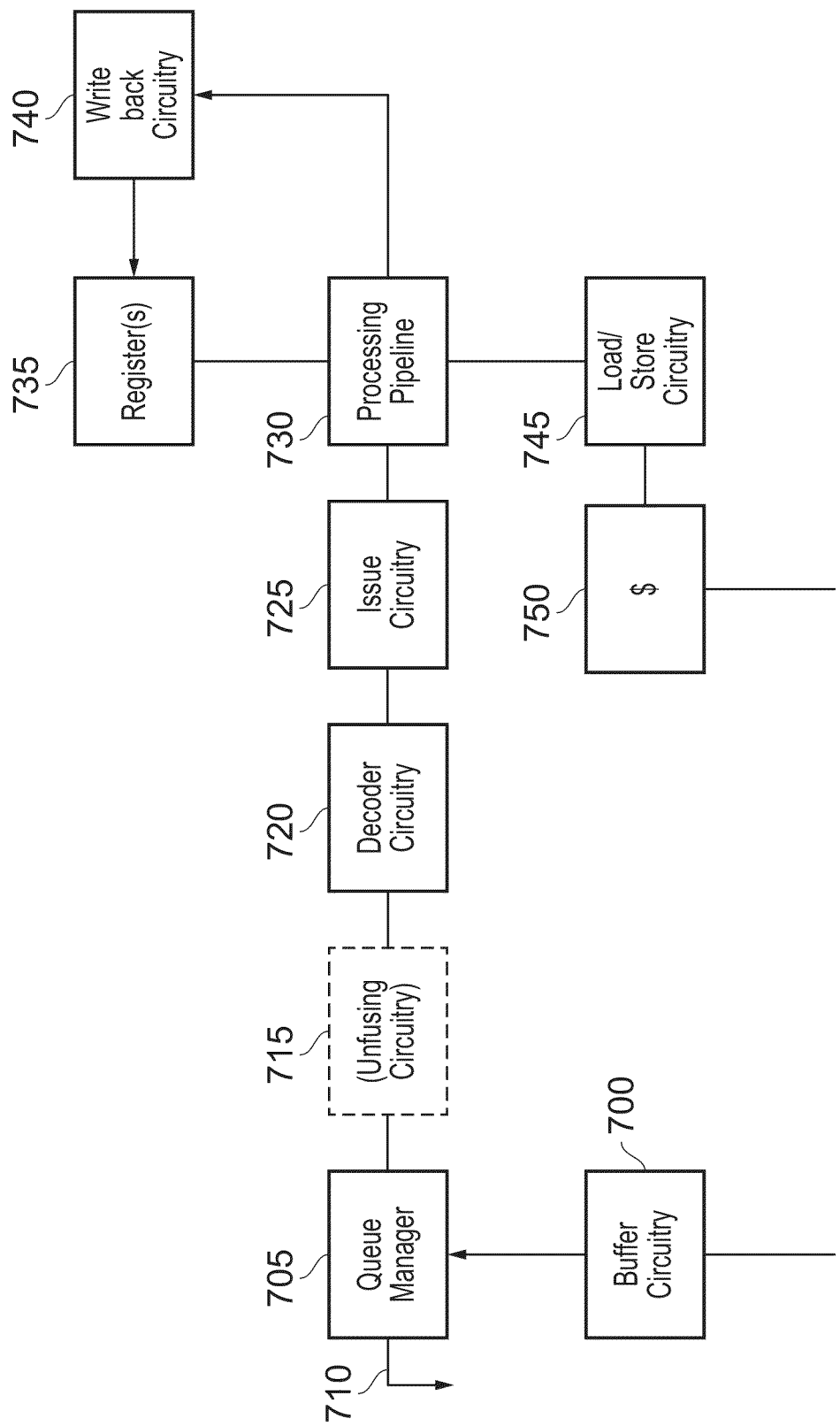
FIG. 7 schematically illustrates a coprocessor.

FIG. 7 schematically illustrates aspects of a coprocessor such as any one of the coprocessors 110, 210, 212 or 320 described above.

Instructions for execution by the coprocessor are buffered or cached by buffer circuitry 700 under the control of a queue manager 705 which queues the received instructions for execution by the coprocessor. The queue manager 705 may have a communication path 710 back to the processor which communicated the instructions and/or back to the arbitration/routing circuitry 220 or the interconnect 330 so as to indicate a prevailing loading of the coprocessor and/or occupancy of the buffer circuitry 700.

In some example embodiments, so-called unfusing circuitry 715 is optionally provided so as to implement an unfusing operation on at least a subset of the received instructions. In other example embodiments, this functionality is not provided. The so-called unfusing function will be described in detail below.

Instructions, whether "as received" or as an output by the unfusing circuitry 715 are passed to decoder circuitry 720 for decoding and from there to issue circuitry 725 to control issue to a processing pipeline 730 which, as described before in connection with the processor of FIG. 4, can access data in one or more registered 735 making use of writeback circuitry 740 to write data to the one or more registers and can communicate with load/store circuitry 745 to communicate from or to a memory system via cache circuitry 750.

The processing pipeline 730 is capable of handling at least some types of fused instruction as received from the relevant processor.

Figure 8:
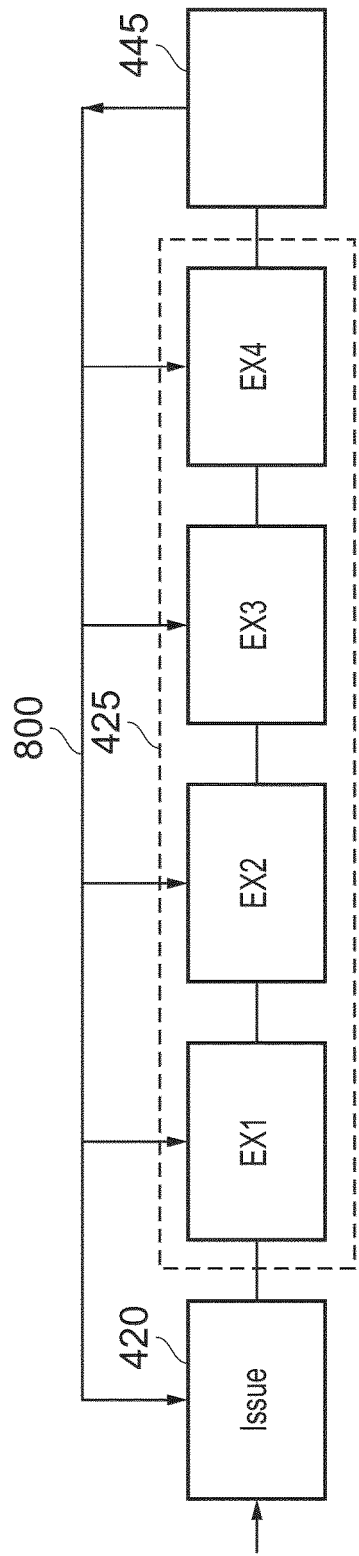
FIG. 8 schematically illustrates a processing pipeline.
Figure 9:
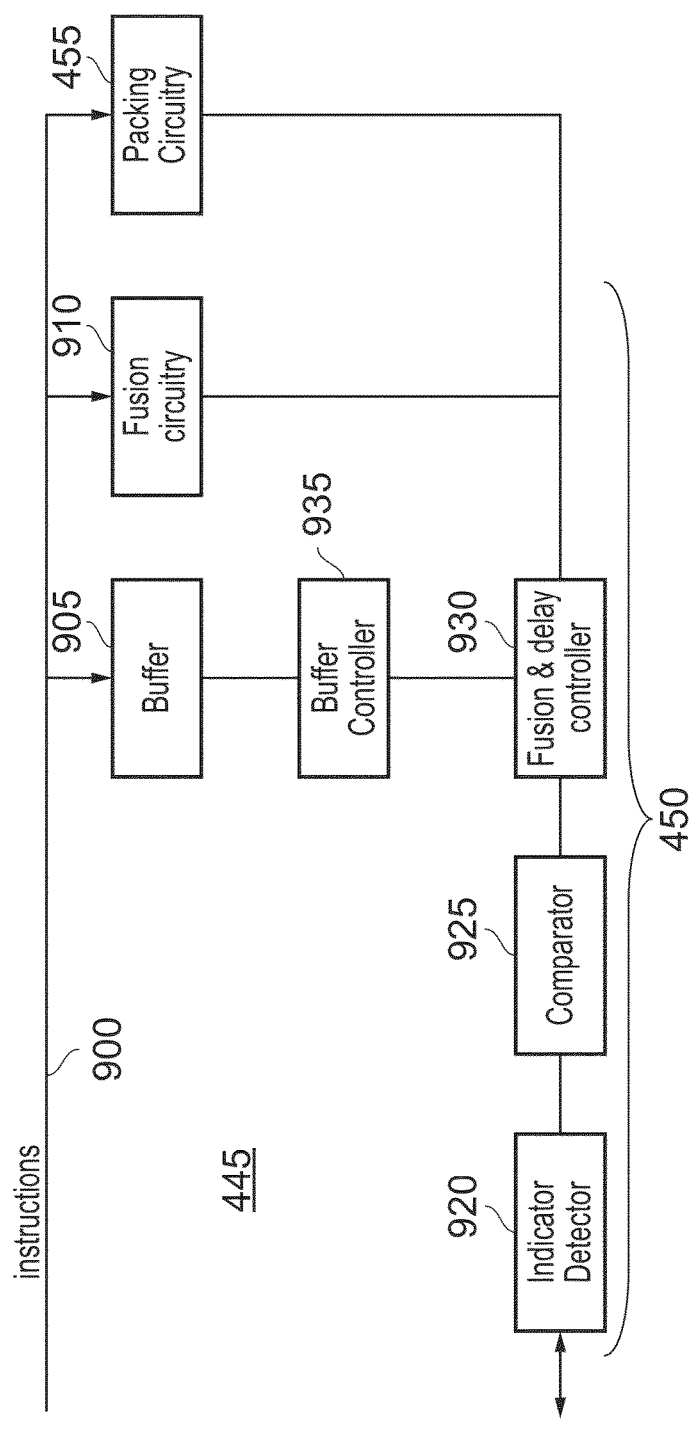
FIG. 9 schematically illustrates an example of instruction fusing circuitry.
Figure 10:
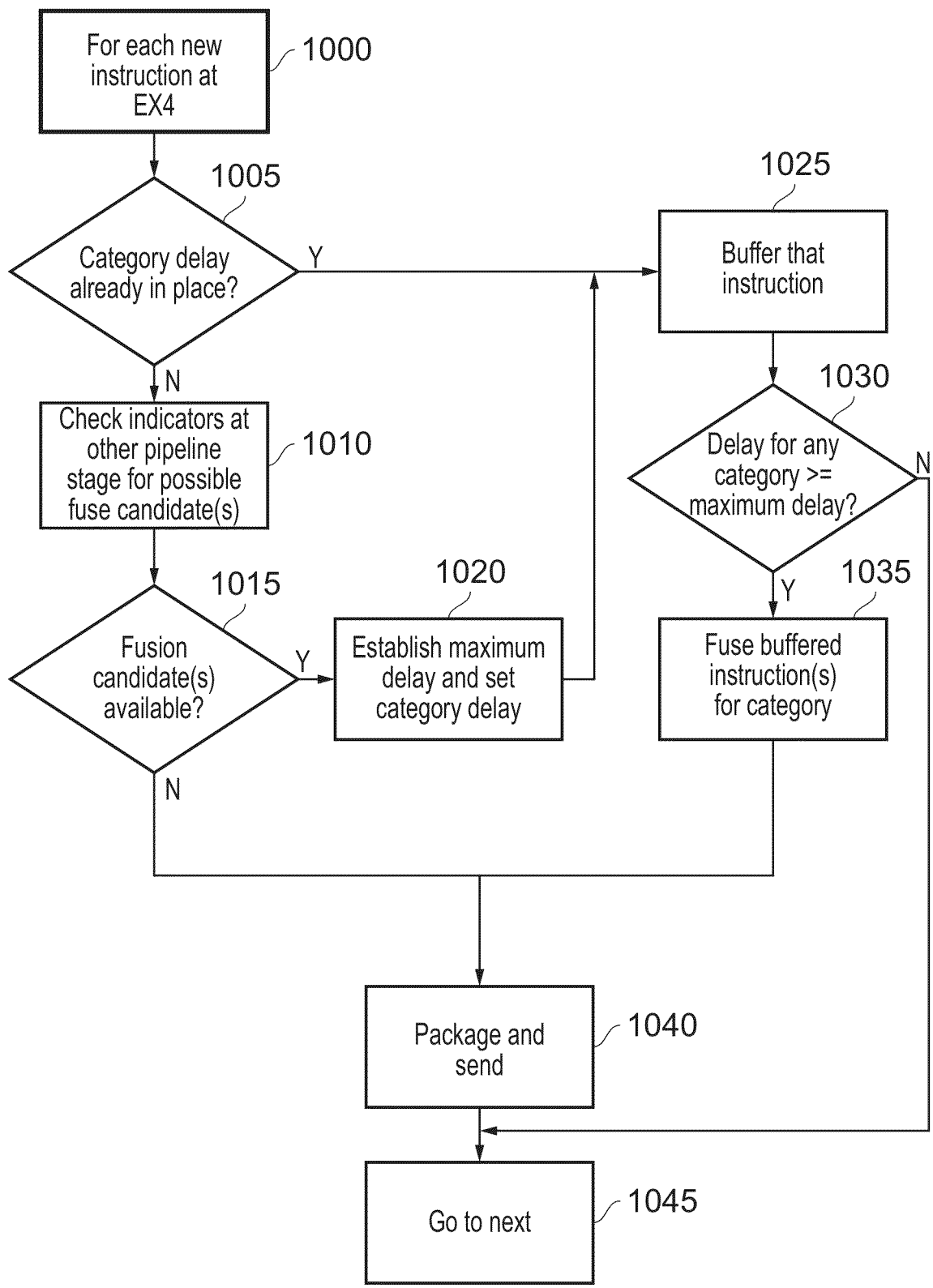
FIGS. 10 to 12 are schematic flowcharts illustrating respective methods.

FIGS. 8 to 10 relates to the so-called late or downstream fusion process which, in example arrangements, is performed in respect of instructions reaching the end of the processing pipeline 425.

FIG. 8 schematically illustrates the issue circuitry 420, the processing pipeline 425 and the circuitry 445 of FIG. 4. As discussed above, each instruction (whether it has been fused or not fused by the upstream instruction fusing circuitry 415) is associated with a tag or indicator which indicates a respective instruction fusing category. The instructions are handled by the issue circuitry 42 for issue to the processing pipeline 425 which comprises (in this example) a succession of four pipeline stages labelled as EX1 . . . EX4. The circuitry 445 is at the output of the pipeline stage EX4.

In brief, when the circuitry 445 encounters (at, or as an output from, the pipeline stage EX4) an instruction with an associated tag or indicator which indicates that it is potentially fusible, the circuitry 445 (in particular, the downstream instruction fusing circuitry 450) queries each of the other pipeline stages EX1 . . . EX3 as well as potentially the issue circuitry 420 to establish whether any of those stages are currently handling one or more younger instructions with a compatible tag or indicator which indicates that they could be fused with the instruction encountered by the circuitry 445. If the outcome of this query process is positive (that is to say, such a fusible instruction exists at an earlier pipeline stage or at the issue circuitry) then packing and communication of the instruction at the circuitry 445 is delayed to allow for the younger instruction(s) to reach the circuitry 445 and to be fused with the older instruction which has been delayed.

Note that a four stage pipeline is just an example, and the plurality of pipeline stages could comprise a different number of pipeline stages.

Worked examples of this process will be described below with reference to FIGS. 13A-13D.

FIG. 9 schematically illustrates aspects of the circuitry 445, which in turn comprises the packing circuitry 455 and the downstream instruction fusing circuitry 450.

The circuitry 445 is configured to receive instructions 900, for communication to the coprocessor, from (or at) the pipeline stage EX4. These instructions are provided to buffer circuitry 905, fusion circuitry 910 and the packing circuitry 455.

The downstream instruction fusing circuitry 450 comprises indicator detector circuitry 920, comparator circuitry 925, a fusion and delay controller 930 and a buffer controller 935, along with the buffer circuitry 905 and the fusion circuitry 900 already mentioned.

In operation, when one or more instructions newly received from the pipeline stage EX4, the indicator detector 920 detects whether any of those received instructions are tagged with a fusion category indicator and, if so, via a communication path 800 (FIG. 8) checks whether any corresponding or at least compatible tags or indicators are present in connection with instructions at the issue circuitry 420 or earlier pipeline stages EX1 . . . EX3. The comparison of the indicator data is performed by the comparator circuitry 925.

If no such younger instructions are present earlier in the pipeline then the fusion and delay controller 930 controls the newly received instruction(s) to be released from the buffer 905 and passed for packing to the packing circuitry 455 without any fusion operation being performed by the fusion circuitry 910 in connection with those instructions. The instructions are packed by the packing circuitry 455 and communicated to the relevant coprocessor.

On the other hand, if the comparison by the comparator circuitry 925 detects that one or more younger instructions are present earlier in the pipeline which can be compatibly fused with the currently buffered newly received instruction(s) then the fusion and delay controller 930 can control operations so as to perform fusion. In particular, the buffer controller 935 controls the buffer circuitry 905 to retain or delay the relevant one or more newly received instructions until arrival of the younger instruction(s) with which they are to be fused. When all of the instructions relevant to a planned fusing operation are present in the buffer circuitry 905 (or, if one or more do not arrive in time, when a maximum delay period has passed) then the fusion circuitry 910 performs fusion before outputting the respective fused instruction to the packing circuitry 455 for communication to the coprocessor.

In respect of the one or more younger instructions detected as being compatible with fusion with the newly received instruction held by the buffer circuitry 905, the fusion and delay controller 930 can operate in various ways to avoid generating a rolling delay period. To explain this aspect, consider a situation in which a delay period has been set in order to wait for a first younger instruction X and a second even younger instruction Y. When the first younger instruction X arrives at EX4 the downstream instruction fusing circuitry 450 is still waiting for the second even younger instruction Y to complete that fusion operation. However, in order to avoid potentially creating a rolling delay which might never lead to the output of a fused instruction, it is appropriate not to restart a delay period when the first younger instruction X is at EX4. In order to avoid restarting the delay, then any one of the following may individually be performed as part of the present techniques:

- the fusion and delay controller maintains no more than one delay period at any time, and does not start a new delay period (even for a different fusion category) while one delay period is in operation
- the fusion and delay controller maintains no more than one delay period for each potential fusion category at any one time, and does not start a new delay period for a given fusion category while one delay period is in operation for that fusion category (this could be implemented, for example, by the fusion and delay controller detecting the category of any currently buffered instructions and establishing a new delay period in respect of an instruction category only when no instructions of that category are currently buffered for fusing)
- the fusion and delay controller maintains a reservation indicating younger instructions which are expected to form part of a given fusing operation, and does not start a new delay period in response to arrival of any of the instructions forming part of that reservation The use of the defined delay period implies that the downstream instruction fusing circuitry 450 is configured to fuse a set of instructions at respective pipeline stages which are separated within the processing pipeline by no more than a threshold number of pipeline stages. In examples, the communication circuitry is configured to defer communication of a set of instructions to be fused by a given fusing operation until one of: the given fusing operation is at least partially performed; or the given fusing operation is cancelled.

In examples, the instruction fusing circuitry is configured to perform the fusing operation in respect of instructions reaching a given pipeline stage of the plurality of pipeline stages; and the instruction fusing circuitry comprises delay circuitry to delay one or more instructions, of a set of instructions, reaching the given pipeline stage to allow one or more other instructions of the set of instructions to reach the given pipeline stage.

For example, the given pipeline stage may be a final pipeline stage of the plurality of pipeline stages such as EX4 in the examples here.

downstream instruction fusing circuitry 450 is arranged to assign a maximum allowable delay after initiation of a given fusing operation; when the set of instructions to be fused by the given fusing operation is available at the given pipeline stage to the instruction fusing circuitry within the maximum allowable delay, to perform the given fusing operation; and when not all of the set of instructions to be fused by the given fusing operation is available at the given pipeline stage to the instruction fusing circuitry within the maximum allowable delay, to selectively cancel the given fusing operation or partially perform the given fusing operation in respect of any instructions of the set of instructions to be fused by the given fusing operation which are available to the instruction fusing circuitry.

FIG. 10 is a schematic flowchart illustrating an example the process just described, and in particular illustrates an arrangement in which the fusion and delay controller 930 maintains no more than one delay period for each fusion category at any one time.

Note that—as discussed above—other examples may make use of a single delay rather than a delay per category. Further details of such an arrangement will be given below.

Referring to FIG. 10, each new instruction arriving at EX4 is considered at a step 1000. Assuming that a fusion category has been associated with that instruction, then at a step 1005 a detection is made as to whether a delay is already in operation in respect of that category. If the answer is no then control passes to a step 1010 at which the comparator circuitry 925 detects the indicators at other pipeline stages to establish any possible fusion candidate instructions. If no fusion candidates are available at a step 1015 then control passes to a step 1040 at which the instruction under consideration is passed for packing and sending by the packing circuitry 445 (noting that the overall process of FIG. 10 may in fact be performed in parallel so that the packing circuitry 445 would normally communicate a packet of instructions once in respect of an entire clock cycle's operation). At the step 1045, control passes back to the step 1000 consideration of a next instruction.

If at the step 1015, fusion candidates are available amongst earlier stages then control passes to a step 1020 at which a maximum delay period is established (see FIGS. 11 and 12 below) and a delay is set for the current fusion category. Control passes to a step 1025 at which the current instruction is buffered. Note that if the category delay was already in place at the step 1005 then control would have passed to the step 1025 as well.

If at a step 1030, the current delay for any category is greater than or equal to the maximum delay set for that category then at a step 1035 any buffered instructions for that category are fused. Note that in the situation where only one instruction is buffered for a given category (which might occur in the case of a pipeline stall which prevents further instructions of that category reaching EX4 within the established delay period) then the "fusion" referred to in the step 1035 is simply a forwarding of the one buffered instruction. Otherwise, if more than one instruction is buffered for a given category then the step 1035 involves fusing the buffered instructions for that category. Control then passes to the step 1040.

If at the step 1030, none of the category delays had reached the maximum delay associated with that category then control simply passes to the step 1045 for consideration of a next instruction.

As mentioned above, the system may maintain a single delay instead of a delay per category. In such an example, the box 1005 of FIG. 10 would test whether a delay (rather than a "category delay") is already in place. The box 1020 would set the delay rather than a category delay. The box 1030 would test whether the prevailing (single) delay is >=the maximum delay.

In other variations, rather than always waiting for the expiry of the delay period (as set out in FIG. 10), the system could fuse and communicate a fused instruction immediately upon fulfilment of either of the following conditions (testing for these conditions would then take the place of the step 1030 in FIG. 10):

on the earliest of (i) the expiry of the global or category-specific delay period and (ii) the arrival at EX4 of a group of one or more instructions containing at least a first instruction fusion candidate which had been identified at the step 1015 for fusion with a buffered instruction; or on the earliest of (i) the expiry of the global or category-specific delay period and (ii) the arrival at EX4 of all of the fusion candidates which had been identified at the step 1015 for fusion with a buffered instruction.

In respect of the late fusion operations discussed above, the downstream instruction fusing circuitry 450 therefore provides an example of instruction fusing circuitry, responsive to the indications associated with instructions at two or more of the plurality of pipeline stages, to selectively perform a fusing operation to fuse a set of instructions at the two or more pipeline stages to generate a respective fused instruction, in which the respective indications associated with each of the set of instructions indicate that the set of instructions are fusible instructions. In these examples, the instruction fusing circuitry is configured to selectively fuse instructions in the second subset of instructions; and the communication circuitry is configured to communicate the second set of instructions and fused instructions generated from the second set of instructions to the second processing circuitry.

In other words, the downstream instruction fusing circuitry 450 is configured to selectively fuse an instruction at a final pipeline stage of the processing pipeline with an instruction at another different pipeline stage of the processing pipeline.

Two examples of processes for establishing an appropriate delay period will now be described with reference to FIGS. 11 and 12 respectively. The process described with reference to FIG. 11 is an adaptive process whereas the process described with reference to FIG. 12 is a non-adaptive process.

Note that the flowchart of FIG. 10 assumed that a maximum delay period is established for each category but of course a common maximum delay period can be established across all categories.

Figures 11, 12:
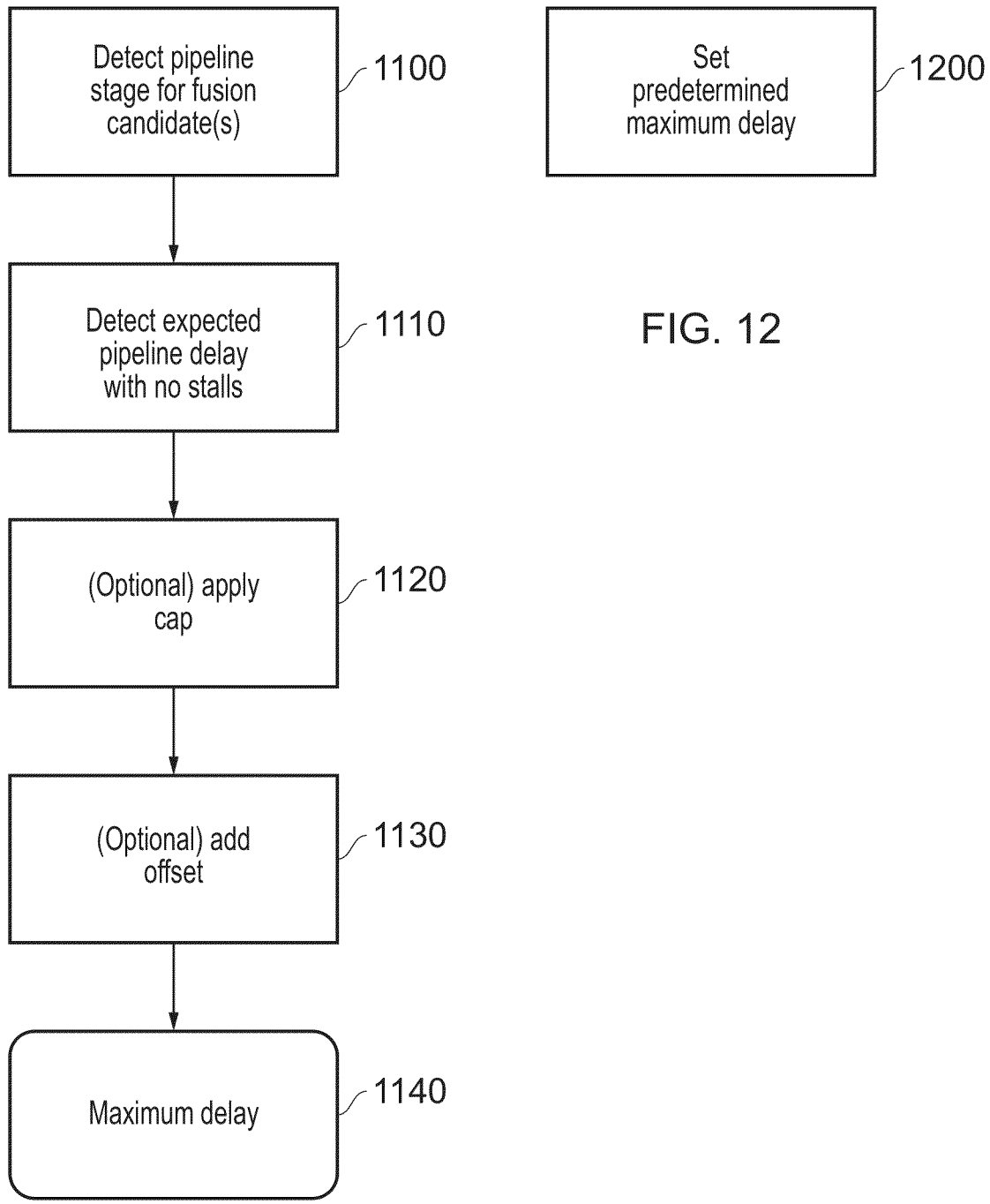

Referring to FIG. 11, at a step 1100 the comparator circuitry 925 detects one or more younger instructions with matching or compatible tags. The younger instructions detected in this way are detected by the comparator circuitry to be associated with respective pipeline stages earlier in the pipeline than EX4. In response to these associated pipeline stages, at a step 1110 the fusion and delay controller 930 detects an expected respective delay period in cycles before those instructions reach EX4 and the circuitry 445. As an optional step 1120, the expected delay period can be capped (for example at three cycles). As another optional step 1130, an offset to allow for stalls or the like can be added to the expected delay period. Finally at a step 1140 the fusion and delay controller 930 establishes the maximum delay as the highest of the one or more expected delay periods as derived by the steps 1110 to 1130.

By contrast, in FIG. 12, the process comprises simply setting (at a step 1200) a predetermined maximum delay period such as for example four clock cycles.

FIGS. 13A to 13D schematically illustrate four successive clock cycles and, for each clock cycle, an example of a group of instructions being handled by each of the pipeline stages EX1 to EX4. It will be seen that from one clock cycle to the next, the instructions which were at a given pipeline stage (such as EX1) move to the next pipeline stage (EX2 in this example) and so on. In FIGS. 13A to 13D unfused instructions are referred to by a letter and number such as "C2". Instructions which were fused by the upstream instruction fusing circuitry 415 before entering the processing pipeline are referred to by two or more letters and numbers (for example "E2 E3" indicating an early or upstream fusion of instructions E2 and E3 from a common fetch group) and a fusion category associated with at least some of the instructions is referred to by "Cat n" where n is a category number. In this example, non-fusible instructions are indicated by a lack of category number, though in other examples a null category number could be applied for this purpose. Note that instructions already fused by the upstream instruction fusing circuitry 415 are nevertheless assigned a category by that circuitry so that they can be applied to subsequent later fusion operations.

The examples represented by FIGS. 13A to 13D make use of a delay period per category. In other examples, a single global delay period could be used, in which case a delay period (of, for example, three cycles) could be set at the clock cycle represented by FIG. 13A, in which case it would expire at the clock cycle represented by FIG. 13D.

Figure 13A:
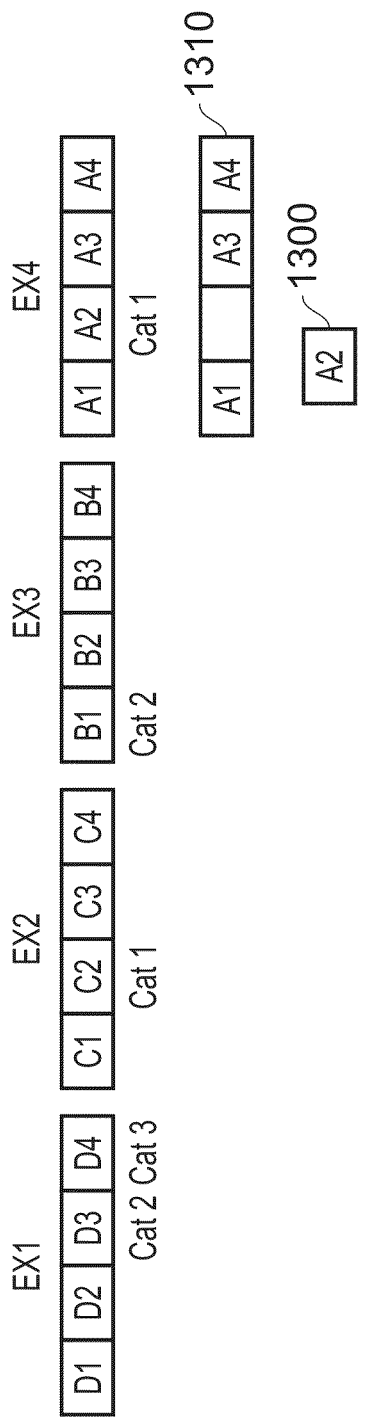
FIGS. 13A to 13D schematically illustrate aspects of the operation of the circuitry of FIG. 9.

Referring to FIG. 13A, an instruction A2 is detected as being potentially fusible with category "Cat 1" at the stage EX4 and is buffered 1300. A delay period of three cycles in this example is established for Cat 1. The other three instructions at EX4 are not categorised as being fusible and are packed 1310 for communication to the coprocessor.

Figure 13B:
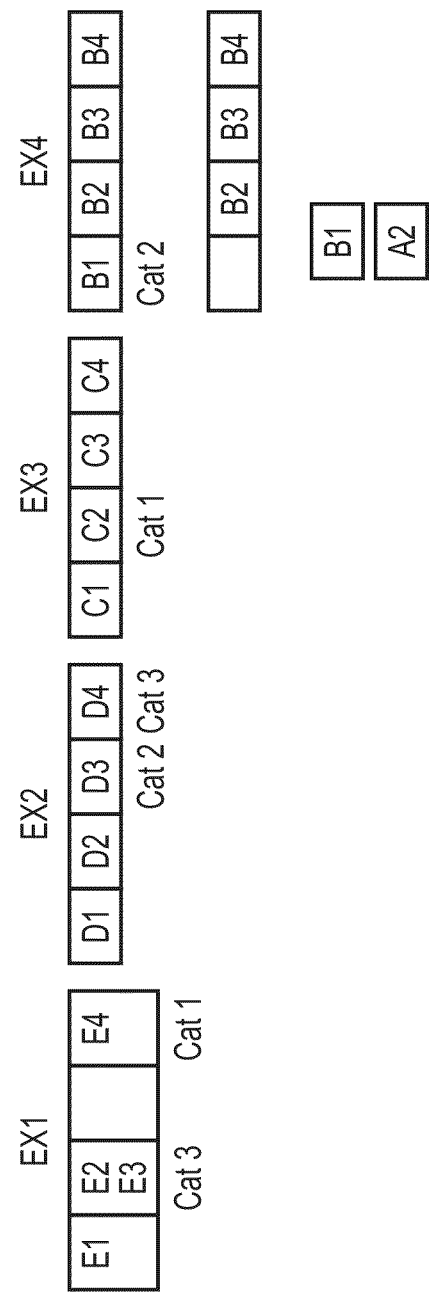

At a next clock cycle illustrated by FIG. 13B, instruction B1 has Cat 2 and is potentially fusible so it is buffered alongside the already-buffered instruction A2 and a separate delay period of three cycles in this example is established for Cat 2. Instructions B2, B3 and B4 are packed for communication to the coprocessor.

Figure 13C:
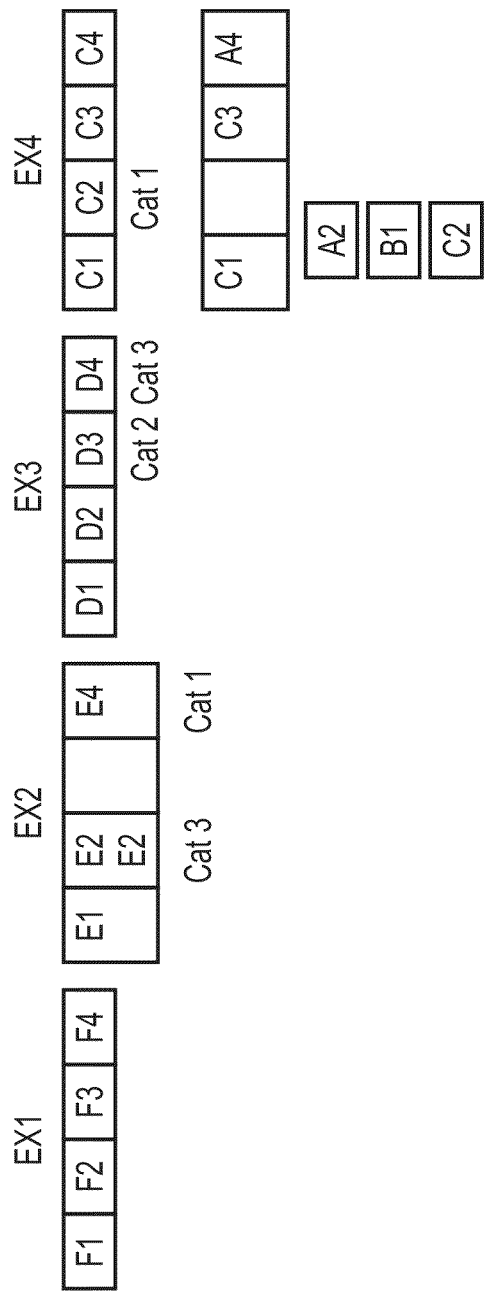

At the next clock cycle represented by FIG. 13C, instruction C2 is fusible with the previously buffered instruction A2 in Cat 1. In this example, no other Cat 1 instructions are present in the pipeline within the original delay period and so at least in principle a fused instruction [C2 A2] could be generated and communicated to the coprocessor now. However, in the present examples and as discussed with reference to FIG. 10, the system continues to buffer both of the instructions A2 and C2 until the end of the delay period of three cycles set at FIG. 13A and will perform the fusion and communication to the coprocessor when the delay period ends (which in this example will be one cycle later in FIG. 13D). Instructions C1, C3 and C4 are packed for communication to the coprocessor.

Figure 13D:
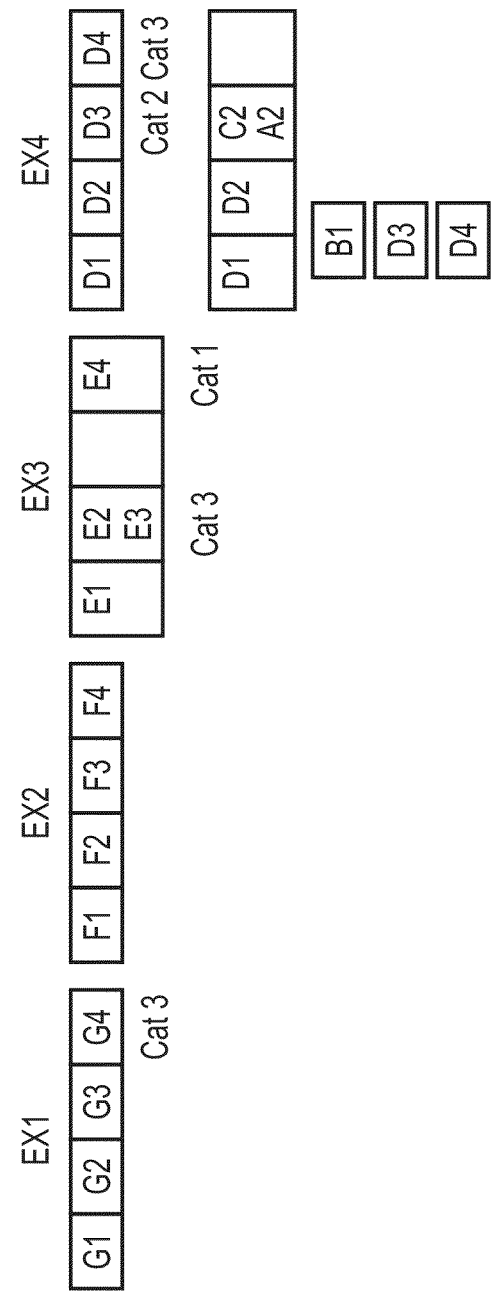

At a next clock cycle represented by FIG. 13D, instruction D4 is buffered with Cat 3 and a new delay period (for example 3 cycles) is established for Cat 3. Instruction D3 is fusible with the previously buffered instruction B1 in Cat 2 and is also buffered until the end of the delay period previously set for Cat 2. The delay period for Cat 1 has however come to an end and so any buffered instructions in that category are fused and communicated—in this case, these are the previously buffered instruction C2 and the previously buffered instruction A2. therefore, the non-fusible instructions D1 and D2 along with the fused instruction [C2 A2] are packed for communication to the coprocessor.

Note that in the example shown in FIGS. 13A to 13D, the system buffers the instructions C2 and A2 at FIG. 13C and waits for the end of the delay period at FIG. 13D before communicating a fused instruction [C2 A2]. However, in other examples, because the fuse candidate instruction C2 has arrived by the clock cycle represented by FIG. 13C, the fused instruction [C2 A2] could be fused and communicated in response to the clock cycle represented by FIG. 13C, without waiting for the end of the delay period.

Note also that in terms of the operation of the instruction fusing circuitry, this circuitry acts to fuse instructions at two or more of the plurality of pipeline stages by waiting until those instructions respectively reach a given pipeline stages such as EX4.

Figure 14:
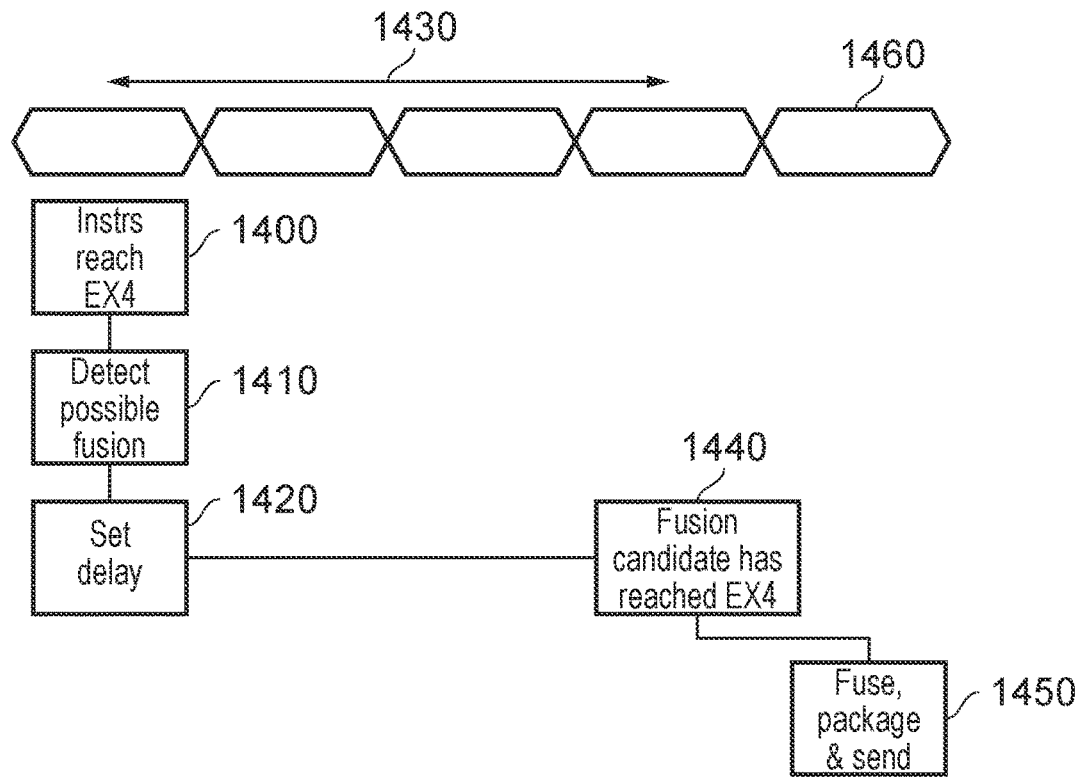
FIGS. 14 and 15 are schematic timing diagrams.
Figure 15:
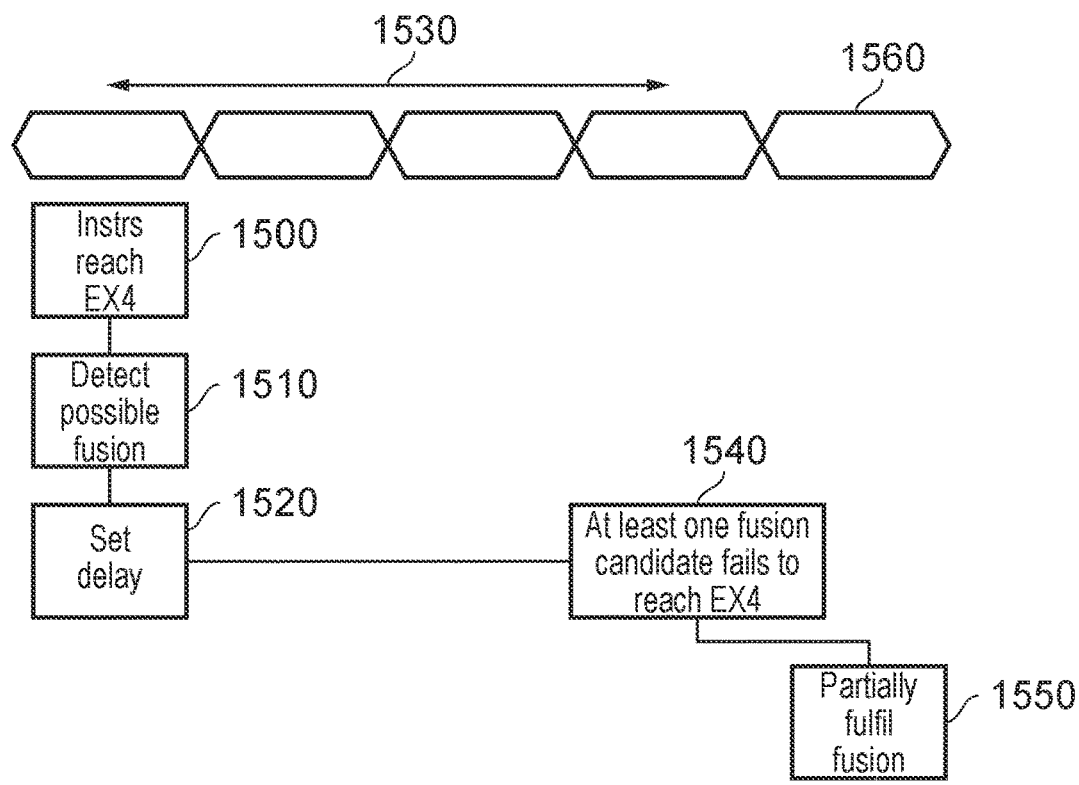

FIGS. 14 and 15 schematically illustrate further aspects of the use of the delay period. In each of these two diagrams, an example delay period of three cycles is implemented, but as discussed with reference to FIGS. 11 and 12 a different delay period could be established either generally or by category. As before, clock cycles are illustrated schematically as 1460, 1560.

In FIG. 14, a processor stall or similar events does not occur and so, at a first clock cycle a possible fusion is detected at a step 1410 in respect of instructions which have reached EX4 at a step 1400. A delay period set at a step 1420 expires at the step 1440 by which (in this example) the remaining fusion candidate or all remaining fusion candidates have reached EX4, so that at a step 1450 fusion can take place successfully and the fused instruction can be packed and communicated.

Note that as described above, the system does not have to wait for the expiry of the delay period if all of the expected fusion candidates have arrived at EX4 before then (or in other examples if at least a first of the expected fusion candidate has arrived at EX4 before then). In such examples it is possible for the system to fuse and communicate a fused instruction earlier than the expiry of the delay period.

In FIG. 15, steps 1500, 1510, 1520 corresponds to the steps 1400, 1410, 1420 of FIG. 14. However, in this case, a processor stall or the like occurs with respect to the processing pipeline such that at a step 1540 at least one expected fusion candidate has failed to reach EX4. However, the delay period has expired so at a step 1550, fusion is carried out in respect of all available instructions for that category (which in principle could be just one instruction, in which case fusion simply involves forwarding that instruction).

Further optional aspects of late fusion will now be discussed, which can apply in the case of (for example) a processor stall or the like temporarily halting progression through the processing pipeline. In such instances, the downstream instruction fusing circuitry 450 can perform instruction fusion within the pipeline itself, or in other words the instruction fusing circuitry can be configured to initiate a fusing operation in response to a stall condition of the processing circuitry.

Figure 16:
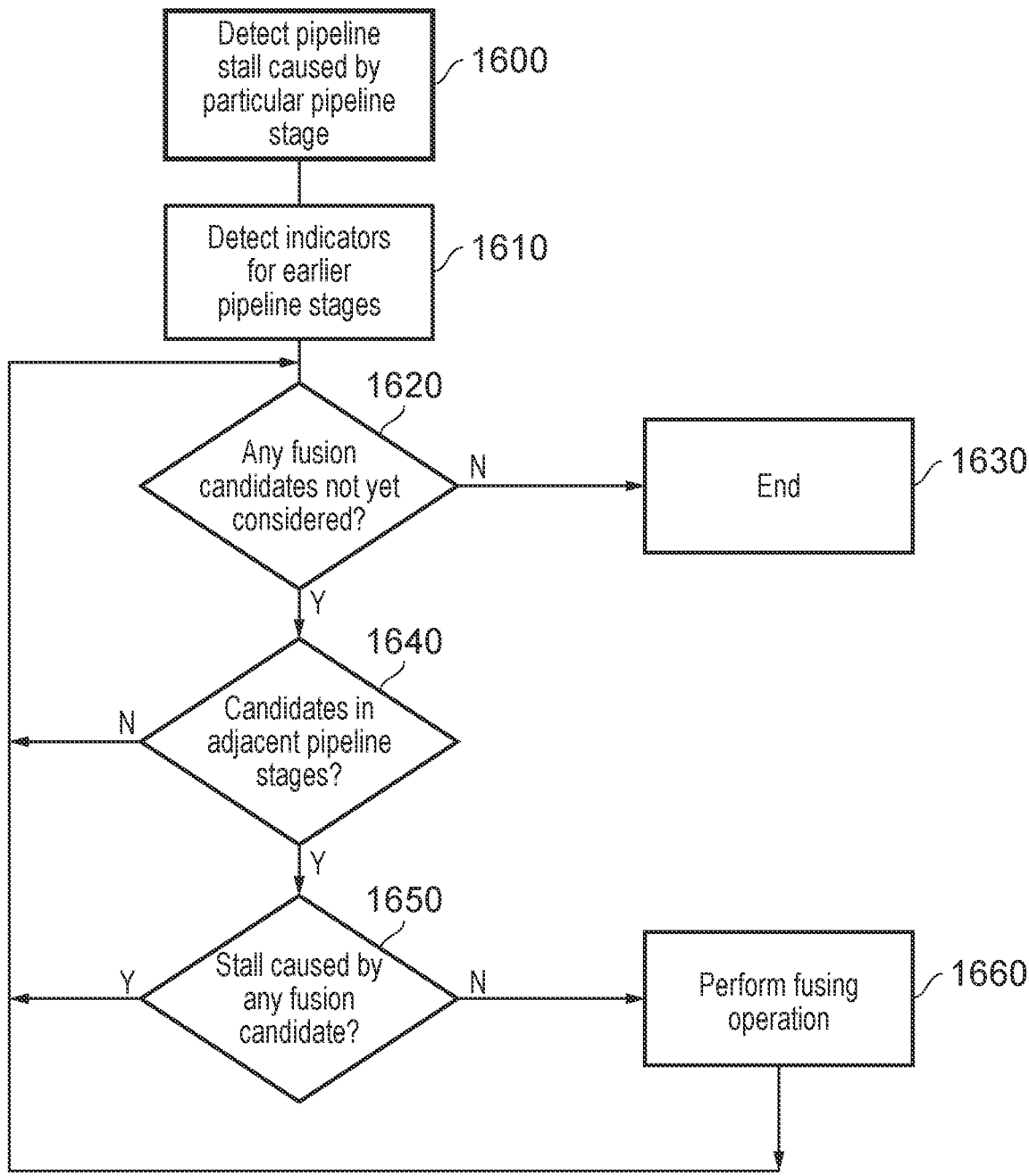
FIG. 16 is a schematic flowchart illustrating a method.

FIG. 16 is a schematic flowchart illustrating such a technique.

At a step 1600 the downstream instruction fusing circuitry 450 detects a pipeline stall caused by an instruction at a particular pipeline stage. At a step 1610, the downstream instruction fusing circuitry 450 detects the indicators illustrative of fusion categories for instructions at earlier pipeline stages, which is to say for younger instructions. If, at a step 1620, there are any potential fusion opportunities amongst those younger instructions then control passes to step 1640. Here, if the fusion candidates are in adjacent pipeline stages then control passes to a step 1650 at which a detection is made as to whether the stall was actually caused by any of the fusion candidates. Assuming it was not then at a step 1660 a fusion operation can be performed between the fusion candidates identified amongst the stalled younger instructions under consideration and control returns to the step 1620.

The negative outcome of the step 1620 (all potential fusion candidates have already been considered) leads to the process ending at a step 1630. The negative outcome of the step 1640 or the positive outcome of the step 1650 lead to a next fusion candidate being considered at the step 1620.

Figure 17:
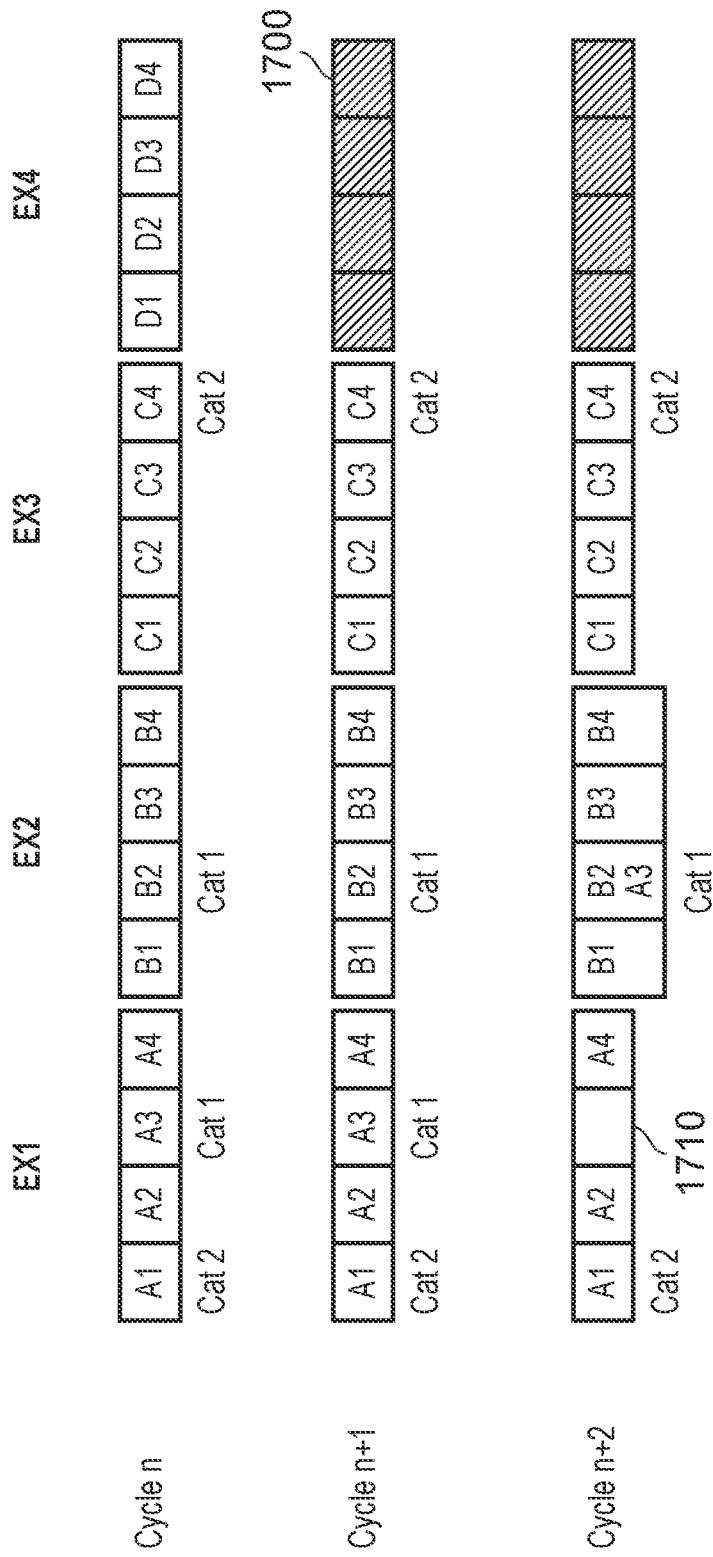
FIG. 17 is a schematic timing diagram.

FIG. 17 schematically illustrates an example of this process with three successive clock cycles n, n+1 and n+2 being illustrated. A stall occurs at cycle n+1 in respect of the pipeline stage EX3 so that for cycles n+1 and n+2, the pipeline stage EX4 contains no information 1700. The process of FIG. 16 can however be performed and identifies fusion candidate instructions A3 and B2 both in Cat 1. The younger instruction A3 is allowed to complete this processing at EX1 despite the stall later in the processing pipeline and is fused to form "B2 A3" at EX2. This opens up a so-called "processing bubble" 1710 at EX1.

Therefore, these arrangements provide examples in which the downstream instruction fusing circuitry 450 is configured to selectively fuse one or more instructions at a given pipeline stage of the processing pipeline with one or more instructions at another different pipeline stage of the processing pipeline adjacent to the given pipeline stage.

In some examples, the instruction fusing circuitry is configured, in response to a stall condition, to detect one or more instructions within the processing pipeline causing the stall condition; and the instruction fusing circuitry is configured to initiate the fusing operation for a given set of instructions when the given set of instructions comprises instructions different to the detected one or more instructions.

The processing circuitry may comprise circuitry to selectively advance one or more instructions at a respective current pipeline stage to a respective next pipeline stage when an instruction at the respective next pipeline stage is part of a set of instructions which has been fused by the instruction fusing circuitry.

Note that the stall processing discussed here can operate within a single processor, which is to say that it does not require the fused instructions to be forwarded to a coprocessor.

Further example techniques will now be described with reference to FIGS. 18 to 22. One technique can be referred to as "unfusing", which is to say at least partially undoing at the coprocessor the fusing operation carried out at the processor. Here, "at least partially" implies that a fused instruction does not have to be completely returned to its original individual instructions but could be processed so as to generate two or more instructions which are still themselves fused instructions. A second technique can also be used in situations where unfusing is available, which is so-called "aggressive fusing". Here, a processor can fuse instructions to a greater extent than at least one of the possible coprocessors in the system is capable of decoding and executing, so relying upon that coprocessor to unfuse any fused instructions which it is incapable of decoding and executing.

Note that the so-called aggressive fusing techniques described here may be applicable to systems using either or both of the upstream and downstream instruction fusing circuitries and respective techniques discussed above. In other words, aggressive fusion can in principle operate (in some examples) with only an upstream fusing circuitry of the type described above, without the use of indicators or downstream fusing.

Figure 18:
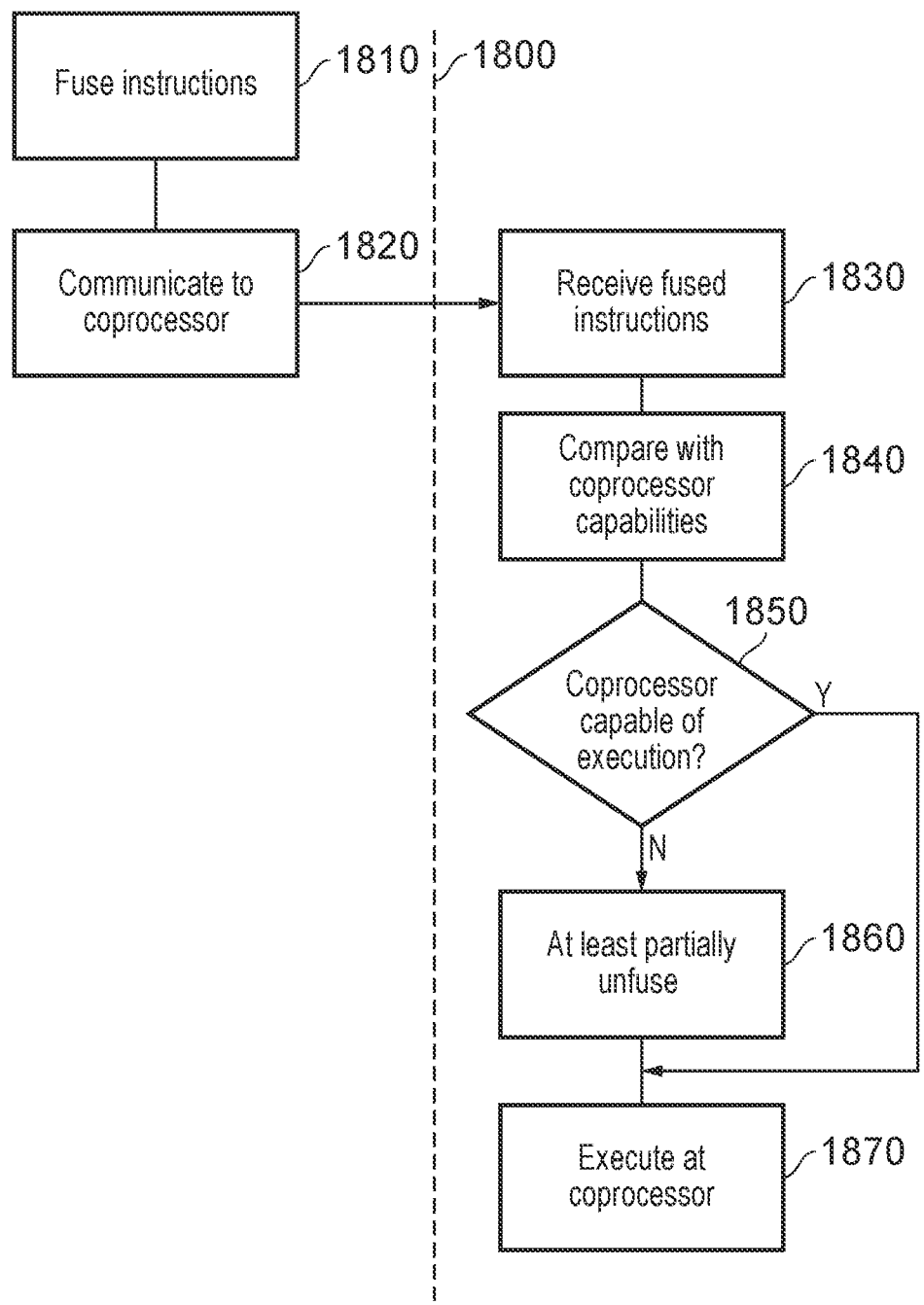
FIG. 18 is a schematic flowchart illustrating a method.

Referring to FIG. 18, operations to the left of a schematic divider 1800 are performed at a processor and operations to the right of the divider 1800 are performed at a coprocessor.

At a step 1810, the processor fuses instructions and, at the step 1820, communicates these to the coprocessor.

At a step 1830 the coprocessor receives the fused instructions and, at a step 1840 compares the fused instructions with data defining the coprocessor's capabilities in terms of decoding and executing instructions. If, at the step 1850, the coprocessor is capable of executing the received instruction is then control passes to a step 1870 at which the instructions are executed at the coprocessor. On the other hand, if the coprocessor is not capable of execution, then at a step 1860 the instructions are at least partially unfused in readiness for execution at the step 1870.

Figure 19:
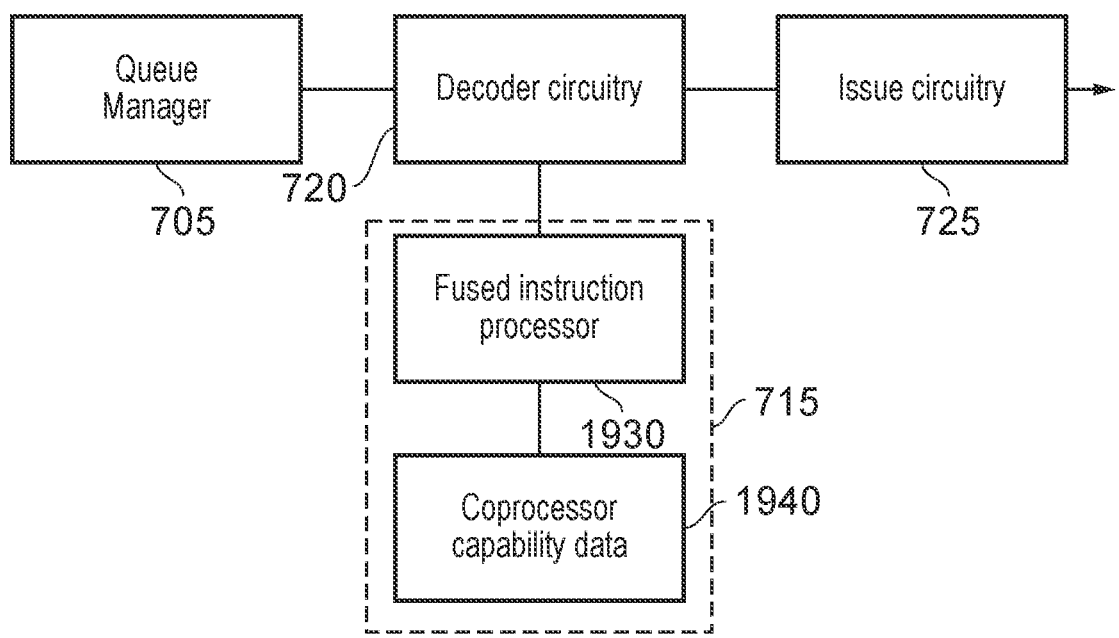
FIG. 19 schematically illustrates further aspects of a coprocessor.

At least the steps 1840 to 1860 can be carried out by the unfusing circuitry 715 of FIG. 7. FIG. 19 schematically illustrates circuitry relating to these operations in which the unfusing circuitry 715 comprises a fused instruction processor 1930 and storage 1940 for coprocessor capability data.

The coprocessor capability data can define categories of instructions, opcodes, combinations of operations or types of parameters or the like which the coprocessor is capable of handling. The fused instruction processor compares a received fused instruction with the coprocessor capability data and, when the received fused instruction lies outside the capabilities of the coprocessor, at least partially unfuses the instruction.

As an example, consider the situation in which a coprocessor can handle a fused "MOV" instruction relating to the same source and different destinations but cannot handle a single fused instruction which concerns multiple different sources.

An example fused instruction is received which combines four operations:

MOV z17.D,z16.D
MOV z21.D,z16.D
MOV z14.D,z15.D
MOV z26.D,z15.D

These in fact relate to two fused pairs of instructions, the first two of which relate to a common source and a second two of which relate to a different common source.

So, in some examples, the fused instruction processor could completely unfuse the received instruction to generate four individual MOV instructions. In other examples, however, the fused instruction processor could partially unfuse the received instruction to generate two fused MOV instructions, the first being a fused instruction relating to the operations:

MOV z17.D,z16.D
MOV z21.D,z16.D and the second being a fused instruction relating to the operations:

MOV z14.D,z15.D
MOV z26.D,z15.D

Figure 20:
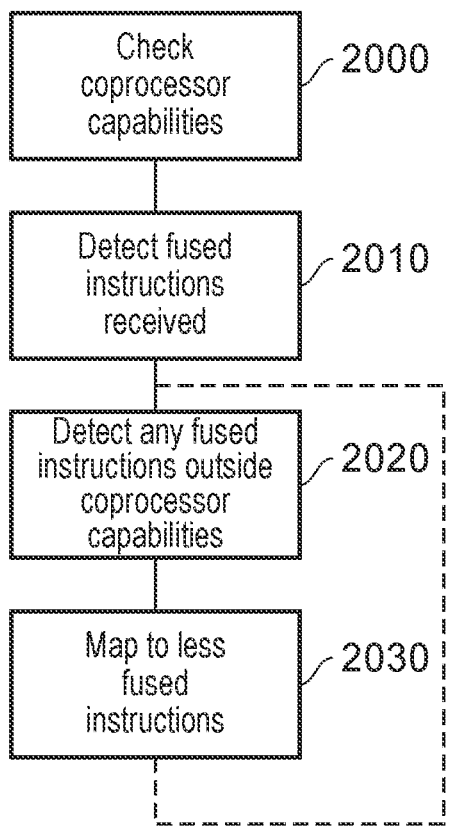
FIGS. 20 and 21 are schematic flowcharts illustrating respective methods.
Figure 21:
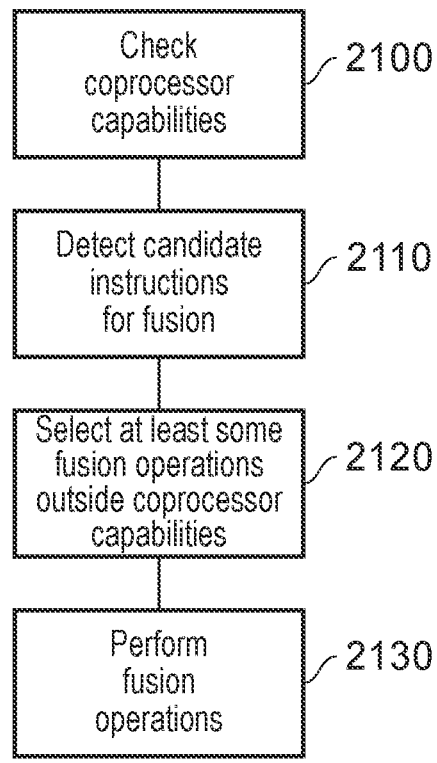

These activities are summarised by FIG. 20 which is a schematic flowchart relating to operations of the fused instruction processor 1930.

At a step 2000, the coprocessor capabilities are checked with respect to the coprocessor capability data stored by the storage 1940. At a step 2010 received fused instructions are detected and at a step 2020, any fused instructions outside the coprocessor capabilities are detected. These are mapped to "less fused" instructions at step 2030 and optionally control returns to the step 2020 to confirm that the newly created less fused instructions are now within the coprocessor capabilities.

Therefore in these examples the coprocessor of FIG. 7 provides an example including communication circuitry 700, 705 to receive instructions including fused instructions communicated by further circuitry;

processing circuitry 720, 725, 730 to execute instructions; and fused instruction pre-processing circuitry (for example, the circuitry 715) to selectively process a given fused instruction received from the communication circuitry and representing a fusion of n individual instructions, where n is an integer greater than 1, so as to generate m separate instructions for execution by the processing circuitry, where m is an integer greater than one and less than or equal to n. For example, in the case of complete unfusing, m may be equal to n.

For example, the fused instruction pre-processing circuitry is responsive to category data (for example stored at the storage 1940) defining one or more categories of fused instructions which the processing circuitry is capable of executing.

In examples, the fused instruction pre-processing circuitry may be configured to detect 2020 a category associated with a fused instruction received from the further circuitry with the category data and, when the category associated with the fused instruction received from the further circuitry indicates that the processing circuitry is capable of executing that fused instruction, to pass that fused instruction to the processing circuitry for execution.

In examples, when the category associated with the fused instruction received from the further circuitry indicates that the processing circuitry is incapable of executing that fused instruction, to process that fused instruction to generate separate instructions of a category which the category data indicates is capable of execution by the processing circuitry.

This unfusing capability opens up the possibility of so-called aggressive fusing at the processor. Here, fusing is carried out to a potentially greater extent than the capabilities at the coprocessor would allow execution. To cope with the fused instructions, unfusing is applied at the coprocessor where necessary. An example arrangement is illustrated by a schematic flowchart of FIG. 21 which concerns steps performed at the processor.

At a step 2100, the processor (either the upstream instruction fusing circuitry 415 or the downstream instruction fusing circuitry 450) checks the capabilities of the or each coprocessor associated with the system and, at the step 2110 detects candidate instructions for fusion. At a step 2120, the processor selects at least some fusion operations which are evidently (from the coprocessor capabilities) outside the capability of at least one coprocessor in the system to execute and at a step 2130 performs fusion operations according to those selections.

The outcome is that fused instructions are potentially communicated to a coprocessor which cannot handle them, in a situation in which the processor had data available to it which indicated that the coprocessor could not handle those fused instructions.

Counterintuitively, this can be useful in at least two example circumstances:

A first example circumstance is that the communication bandwidth between processors and coprocessors is either limited or costly (in terms of power consumption, substrate area, component count or the like) so that aggressive fusion can form a compression technique to compress the amount of information which has to be transmitted from a processor to a coprocessor, with unfusing acting as a corresponding decompression technique. This can reduce the communication bandwidth requirements as between processors and coprocessors.

A second example circumstance is that a processor is connectable within a system to an ensemble of different coprocessors, at least two of which have different execution capabilities. Aggressive fusion allows the processor to perform fusion to an extent which at least one of the coprocessors could handle, such that if the fused instructions are routed to a coprocessor which cannot handle them then unfusing can be performed at that coprocessor to convert the fused instructions into less-fused instructions which that coprocessor can in fact handle.

Figure 22:
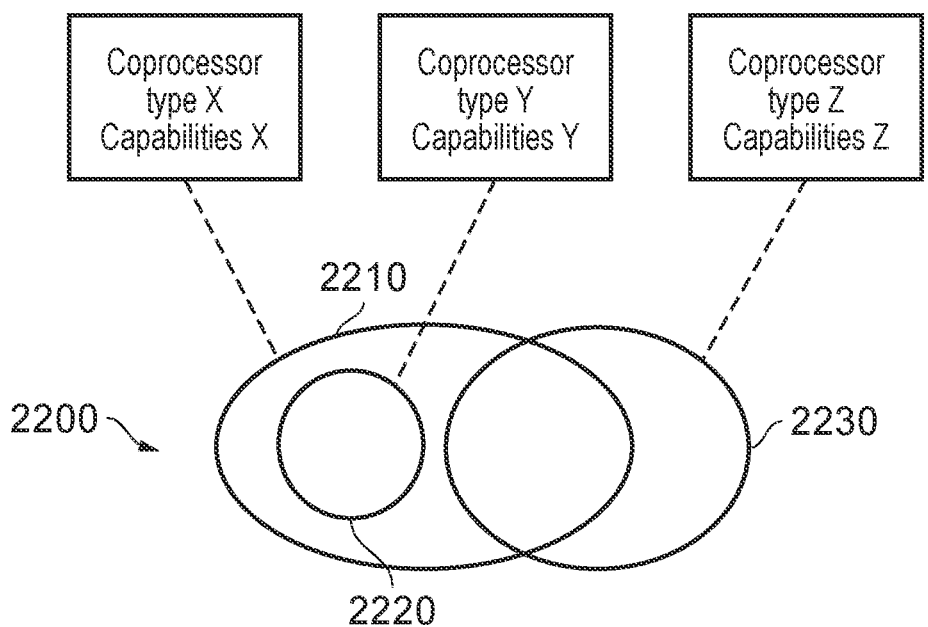
FIG. 22 schematically illustrates an ensemble of coprocessors.

This latter arrangement of coprocessor capabilities within a system is illustrated schematically by FIG. 22 which provides a Venn diagram 2200 illustrating the capabilities of a coprocessor type X 2210, a subset of which capabilities 2220 are available to a coprocessor type Y and an intersecting set of capabilities 20 to 30 available to a coprocessor type Z. In an aggressive fusion system, fusion could be applied by the processor to the union of the sets 2210, 2230 for example.

Here, each coprocessor is associated with respective data defining one or more categories of fused instructions which the processing circuitry of that coprocessor is capable of executing, the respective data for one coprocessor of the plurality of coprocessors defining at least one category of fused instructions different to those defined by the respective data for another different coprocessor of the plurality of coprocessors.

Aggressive fusing as described above can therefore be summarised by the set of instructions upon which a fusing operation is performed at the processor being one of a plurality of sets of instructions, the plurality of sets of instructions comprising: one or more sets of instructions which, when fused, provide a fused instruction which is executable by the processing circuitry of a coprocessor; and one or more sets of instructions which, when fused, provide a fused instruction which is not executable by the processing circuitry of the coprocessor.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 23:
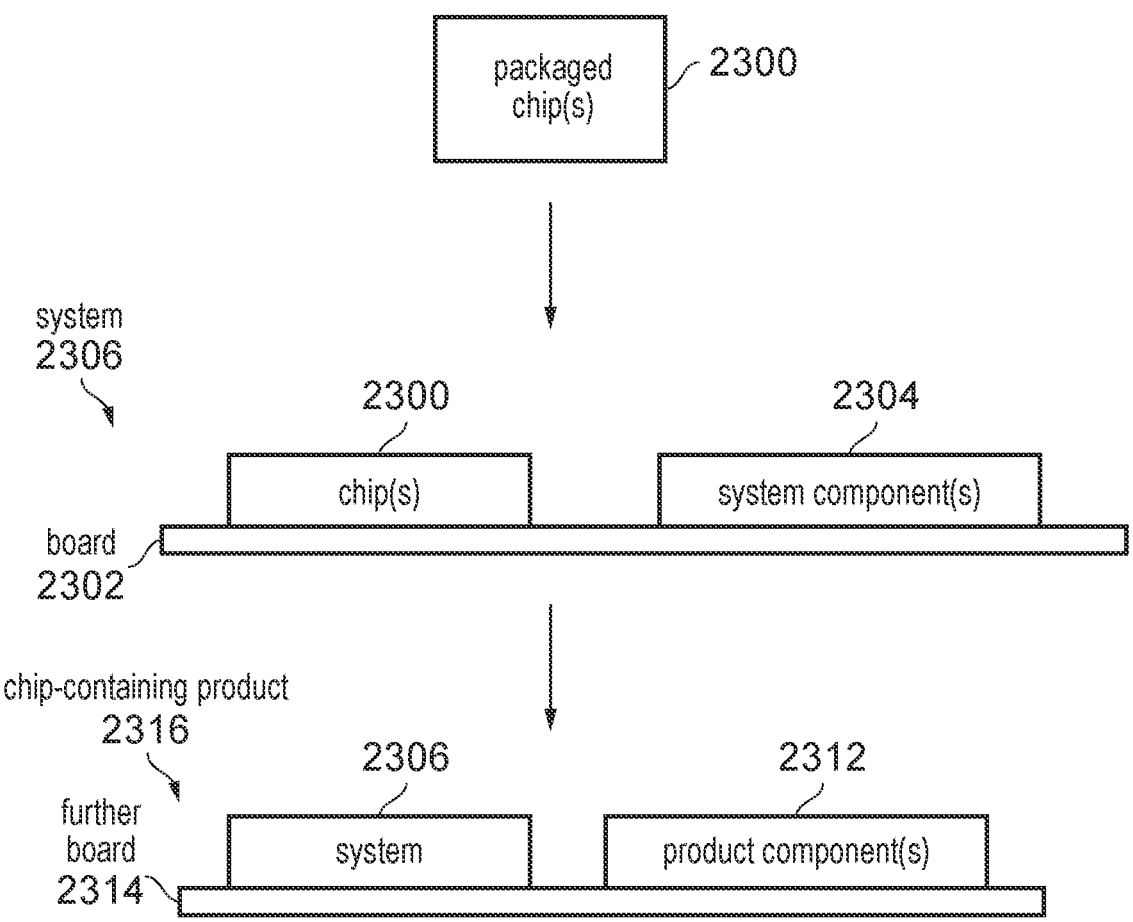
FIG. 23 schematically illustrates a system and a chip-containing product.

As shown in FIG. 23, one or more packaged chips 2300, with the apparatus described above (either a processor as described above, or a coprocessor as described above, or a system of one or more processors and one or more coprocessors) implemented on one chip or distributed over two or more of the chips, are manufactured by a semiconductor chip manufacturer. In some examples, the chip product made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 2300 is provided, these could be provided as separate integrated circuits (provided as separate packets), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 2300 are assembled on a board 2302 together with at least one system component 2304 to provide a system 2306. For example, the board may comprise a printed circuit board. The board substrate may be made of any of a variety of materials, e.g. plastic, glass, ceramic, or a flexible substrate material such as paper, plastic or textile material. The at least one system component 2304 comprise one or more external components which are not part of the one or more packaged chip(s) 2300. For example, the at least one system component 2304 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 2316 is manufactured comprising the system 406 (including the board 2302, the one or more chips 2300 and the at least one system component 2304) and one or more product components 2312. The product components 412 comprise one or more further components which are not part of the system 2306. As a non-exhaustive list of examples, the one or more product components 2312 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 2306 and one or more product components 2312 may be assembled on to a further board 2314.

The board 2302 or the further board 2314 may be provided on or within a device housing or other structural support (e.g. a frame or blade) to provide a product which can be handled by a user and/or is intended for operational use by a person or company.

The system 2306 or the chip-containing product 2316 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 24:
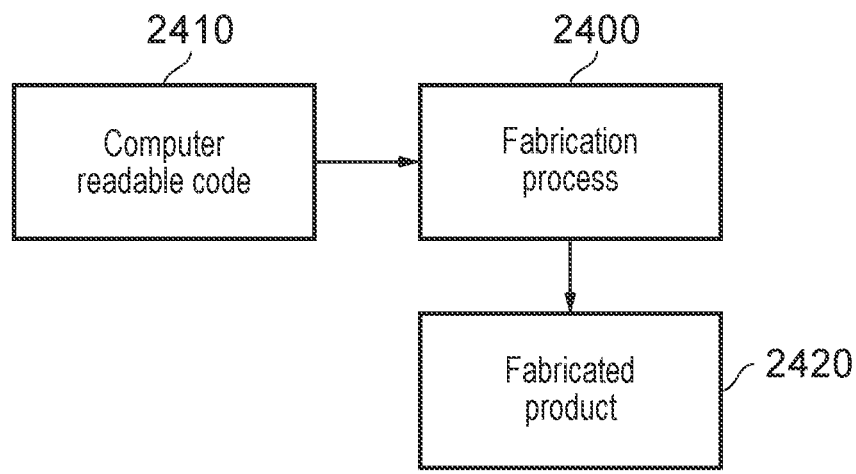
FIG. 24 schematically illustrates a fabrication method.

A schematic example of such an arrangement is provided by FIG. 24, which schematically illustrates a fabrication method comprising a fabrication process step 2400 which refers to computer readable code 2410 of the type described above, and which leads to the generation of a fabricated product 2420.

Further example arrangements will be described with reference to FIGS. 25 and 26.

Figures 25, 26:
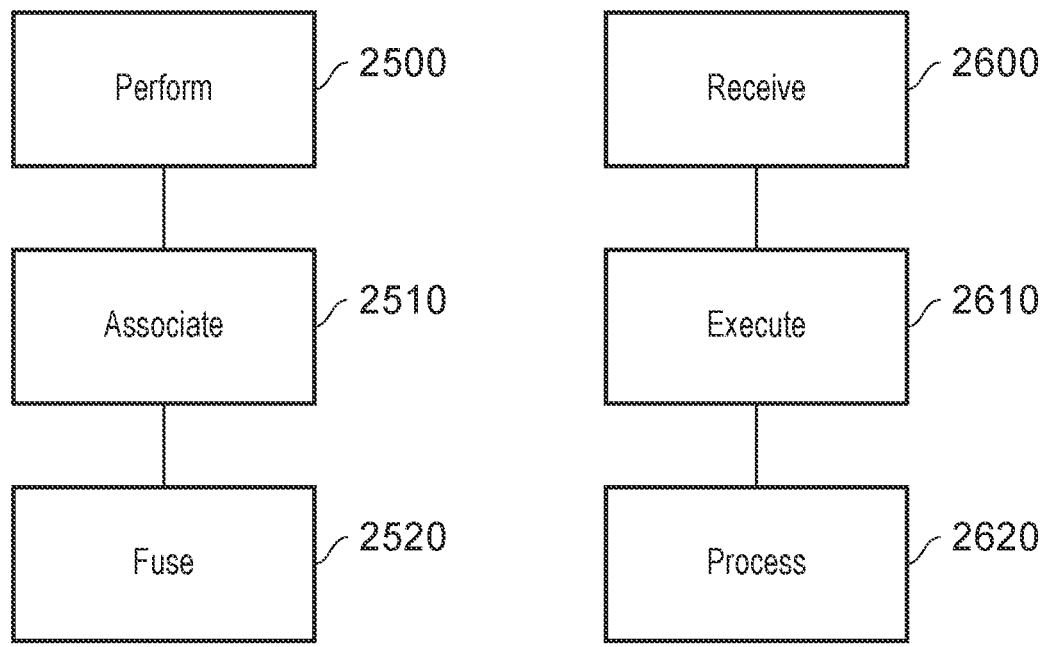
FIGS. 25 and 26 are schematic flowcharts illustrating respective methods.

FIG. 25 schematically illustrates a method comprising:
performing (at a step 2500) data processing operations using a processing pipeline in response to instructions received as successive fetch groups of instructions, the processing pipeline comprising a plurality of successive pipeline stages;
associating (at a step 2510) an indication with instructions for handling by the performing step, the indication associated with a given instruction indicating whether the given instruction is a fusible instruction; and
in response to the indications associated with instructions at two or more of the plurality of pipeline stages, selectively fusing (at a step 2520) a set of instructions at the two or more pipeline stages to generate a respective fused instruction, in which the respective indications associated with each of the set of instructions indicate that the set of instructions are fusible instructions.

FIG. 26 schematically illustrates a method comprising:
receiving (at a step 2600) instructions including fused instructions;
executing (at a step 2610) instructions; and
selectively processing (at a step 2620) a given fused instruction representing a fusion of n individual instructions, where n is an integer greater than 1, so as to generate m separate instructions for execution by the execution step, where m is an integer less than or equal to n.

Some examples are set out in the following clauses:
1. Apparatus comprising:
processing circuitry comprising a processing pipeline to perform data processing operations in response to instructions received as successive fetch groups of instructions, the processing pipeline comprising a plurality of successive pipeline stages;
indicator circuitry to associate an indication with instructions for handling by the processing circuitry, the indication associated with a given instruction indicating whether the given instruction is a fusible instruction; and
instruction fusing circuitry, responsive to the indications associated with instructions at two or more of the plurality of pipeline stages, to selectively perform a fusing operation to fuse a set of instructions at the two or more pipeline stages to generate a respective fused instruction, in which the respective indications associated with each of the set of instructions indicate that the set of instructions are fusible instructions.

2. The apparatus of clause 1, comprising:
decoder circuitry to decode a first subset of instructions for execution by the processing circuitry; and
communication circuitry to selectively communicate a second subset of instructions, different to the first subset of instructions, to second processing circuitry for execution.

3. The apparatus of clause 2, in which:
the instruction fusing circuitry is configured to selectively fuse instructions in the second subset of instructions; and
the communication circuitry is configured to communicate the second set of instructions and fused instructions generated from the second set of instructions to the second processing circuitry.

4. The apparatus of any one of the preceding clauses, in which:
the indicator circuitry is configured to detect an instruction category;
the indication associated with the given instruction by the indicator circuitry is configured to indicate the instruction category of the given instruction; and
the instruction fusing circuitry is configured to fuse a set of instructions having the same instruction category.

5. The apparatus of any one of the preceding clauses, in which the instruction fusing circuitry is configured to fuse a set of instructions at respective pipeline stages which are separated within the processing pipeline by no more than a threshold number of pipeline stages.

6. The apparatus of any one of the preceding clauses, comprising second instruction fusing circuitry to selectively fuse two or more instructions from the same fetch group of instructions; and in which:
the indicator circuitry is configured to associate the indication with fused instructions generated by the second instruction fusing circuitry; and
the instruction fusing circuitry is configured to selectively fuse a set of instructions for which one or more instructions in the set of instructions are fused instructions generated by the second instruction fusing circuitry.

7. The apparatus of any one of the preceding clauses, in which the instruction fusing circuitry is configured to selectively fuse an instruction at a final pipeline stage of the processing pipeline with an instruction at another different pipeline stage of the processing pipeline.

8. The apparatus of clause 7, in which the communication circuitry is configured to selectively communicate instructions at a final pipeline stage of the processing pipeline and instructions fused by the instruction fusing circuitry.

9. The apparatus of any one of the preceding clauses, in which:
the instruction fusing circuitry is configured to perform the fusing operation in respect of instructions reaching a given pipeline stage of the plurality of pipeline stages; and
the instruction fusing circuitry comprises delay circuitry to delay one or more instructions, of a set of instructions, reaching the given pipeline stage to allow one or more other instructions of the set of instructions to reach the given pipeline stage.

10. The apparatus of clause 9, in which the instruction fusing circuitry is configured:
to assign a maximum allowable delay after initiation of a given fusing operation;
when the set of instructions to be fused by the given fusing operation is available at the given pipeline stage to the instruction fusing circuitry within the maximum allowable delay, to perform the given fusing operation; and
when not all of the set of instructions to be fused by the given fusing operation is available at the given pipeline stage to the instruction fusing circuitry within the maximum allowable delay, to selectively cancel the given fusing operation or partially perform the given fusing operation in respect of any instructions of the set of instructions to be fused by the given fusing operation which are available to the instruction fusing circuitry.

11. The apparatus of any one of the preceding clauses, in which the instruction fusing circuitry is configured to initiate a fusing operation in response to a stall condition of the processing circuitry.

12. The apparatus of clause 11, in which the instruction fusing circuitry is configured to selectively fuse one or more instructions at a given pipeline stage of the processing pipeline with one or more instructions at another different pipeline stage of the processing pipeline adjacent to the given pipeline stage.

13. The apparatus of clause 12, in which:
the instruction fusing circuitry is configured, in response to a stall condition, to detect one or more instructions within the processing pipeline causing the stall condition; and
the instruction fusing circuitry is configured to initiate the fusing operation for a given set of instructions when the given set of instructions comprises instructions different to the detected one or more instructions.

14. The apparatus of any one of clauses 11 to 13, in which the processing circuitry comprises circuitry to selectively advance one or more instructions at a respective current pipeline stage to a respective next pipeline stage when an instruction at the respective next pipeline stage is part of a set of instructions which has been fused by the instruction fusing circuitry.

15. The apparatus of clause 2 or any one of clauses 3 to 14 as dependent upon clause 2, comprising coprocessor circuitry, the coprocessor circuitry comprising:
second processing circuitry to execute the second subset of instructions; and
second communication circuitry to receive instructions communicated by the communication circuitry.

16. The apparatus of clause 15, in which the coprocessor circuitry comprises:
second decoder circuitry to decode instructions for execution by the second processing circuitry; and
buffer circuitry to buffer instructions communicated from the communication circuitry to the coprocessor circuitry.

17. A method comprising:
performing data processing operations using a processing pipeline in response to instructions received as successive fetch groups of instructions, the processing pipeline comprising a plurality of successive pipeline stages;
associating an indication with instructions for handling by the performing step, the indication associated with a given instruction indicating whether the given instruction is a fusible instruction; and
in response to the indications associated with instructions at two or more of the plurality of pipeline stages, selectively fusing a set of instructions at the two or more pipeline stages to generate a respective fused instruction, in which the respective indications associated with each of the set of instructions indicate that the set of instructions are fusible instructions.

18. A system comprising:
the apparatus of any one of clauses 1 to 16, implemented in at least one packaged chip;
at least one system component; and
a board,
wherein the at least one packaged chip and the at least one system component are assembled on the board.

19. A chip-containing product comprising the system of clause 18, wherein the system is assembled on a further board with at least one other product component.

20. A non-transitory computer-readable medium to store computer-readable code for fabrication of the apparatus of any one of clauses 1 to 16.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. Apparatus comprising:
processing circuitry comprising a processing pipeline to perform data processing operations in response to instructions received as successive fetch groups of instructions, the processing pipeline comprising a plurality of successive pipeline stages;
indicator circuitry to associate an indication with instructions for handling by the processing circuitry, the indication associated with a given instruction indicating whether the given instruction is a fusible instruction; and
instruction fusing circuitry, responsive to the indications associated with instructions at two or more of the plurality of pipeline stages, to selectively perform a fusing operation to fuse a set of instructions at the two or more pipeline stages to generate a respective fused instruction, in which the respective indications associated with each of the set of instructions indicate that the set of instructions are fusible instructions.

2. The apparatus of claim 1, comprising:
  decoder circuitry to decode a first subset of instructions for execution by the processing circuitry; and
  communication circuitry to selectively communicate a second subset of instructions, different to the first subset of instructions, to second processing circuitry for execution.

3. The apparatus of claim 2, in which:
  the instruction fusing circuitry is configured to selectively fuse instructions in the second subset of instructions; and
  the communication circuitry is configured to communicate the second set of instructions and fused instructions generated from the second set of instructions to the second processing circuitry.

4. The apparatus of claim 1, in which:
  the indicator circuitry is configured to detect an instruction category;
  the indication associated with the given instruction by the indicator circuitry is configured to indicate the instruction category of the given instruction; and
  the instruction fusing circuitry is configured to fuse a set of instructions having the same instruction category.

5. The apparatus of claim 1, in which the instruction fusing circuitry is configured to fuse a set of instructions at respective pipeline stages which are separated within the processing pipeline by no more than a threshold number of pipeline stages.

6. The apparatus of claim 1, comprising second instruction fusing circuitry to selectively fuse two or more instructions from the same fetch group of instructions; and in which:
  the indicator circuitry is configured to associate the indication with fused instructions generated by the second instruction fusing circuitry; and
  the instruction fusing circuitry is configured to selectively fuse a set of instructions for which one or more instructions in the set of instructions are fused instructions generated by the second instruction fusing circuitry.

7. The apparatus of claim 1, in which the instruction fusing circuitry is configured to selectively fuse an instruction at a final pipeline stage of the processing pipeline with an instruction at another different pipeline stage of the processing pipeline.

8. The apparatus of claim 7, in which the communication circuitry is configured to selectively communicate instructions at a final pipeline stage of the processing pipeline and instructions fused by the instruction fusing circuitry.

9. The apparatus of claim 1, in which:
  the instruction fusing circuitry is configured to perform the fusing operation in respect of instructions reaching a given pipeline stage of the plurality of pipeline stages; and
  the instruction fusing circuitry comprises delay circuitry to delay one or more instructions, of a set of instructions, reaching the given pipeline stage to allow one or more other instructions of the set of instructions to reach the given pipeline stage.

10. The apparatus of claim 9, in which the instruction fusing circuitry is configured:
  to assign a maximum allowable delay after initiation of a given fusing operation;
  when the set of instructions to be fused by the given fusing operation is available at the given pipeline stage to the instruction fusing circuitry within the maximum allowable delay, to perform the given fusing operation; and
  when not all of the set of instructions to be fused by the given fusing operation is available at the given pipeline stage to the instruction fusing circuitry within the maximum allowable delay, to selectively cancel the given fusing operation or partially perform the given fusing operation in respect of any instructions of the set of instructions to be fused by the given fusing operation which are available to the instruction fusing circuitry.

11. The apparatus of claim 1, in which the instruction fusing circuitry is configured to initiate a fusing operation in response to a stall condition of the processing circuitry.

12. The apparatus of claim 11, in which the instruction fusing circuitry is configured to selectively fuse one or more instructions at a given pipeline stage of the processing pipeline with one or more instructions at another different pipeline stage of the processing pipeline adjacent to the given pipeline stage.

13. The apparatus of claim 12, in which:
  the instruction fusing circuitry is configured, in response to a stall condition, to detect one or more instructions within the processing pipeline causing the stall condition; and
  the instruction fusing circuitry is configured to initiate the fusing operation for a given set of instructions when the given set of instructions comprises instructions different to the detected one or more instructions.

14. The apparatus of claim 11, in which the processing circuitry comprises circuitry to selectively advance one or more instructions at a respective current pipeline stage to a respective next pipeline stage when an instruction at the respective next pipeline stage is part of a set of instructions which has been fused by the instruction fusing circuitry.

15. The apparatus of claim 2, comprising coprocessor circuitry, the coprocessor circuitry comprising:
  second processing circuitry to execute the second subset of instructions; and
  second communication circuitry to receive instructions communicated by the communication circuitry.

16. The apparatus of claim 15, in which the coprocessor circuitry comprises:
  second decoder circuitry to decode instructions for execution by the second processing circuitry; and
  buffer circuitry to buffer instructions communicated from the communication circuitry to the coprocessor circuitry.

17. A method comprising:
  performing data processing operations using a processing pipeline in response to instructions received as successive fetch groups of instructions, the processing pipeline comprising a plurality of successive pipeline stages;
  associating an indication with instructions for handling by the performing step, the indication associated with a given instruction indicating whether the given instruction is a fusible instruction; and
  in response to the indications associated with instructions at two or more of the plurality of pipeline stages, selectively fusing a set of instructions at the two or more pipeline stages to generate a respective fused instruction, in which the respective indications associated with each of the set of instructions indicate that the set of instructions are fusible instructions.

18. A system comprising:
the apparatus of claim 1, implemented in at least one packaged chip;
at least one system component; and
a board,
wherein the at least one packaged chip and the at least one system component are assembled on the board.

19. A chip-containing product comprising the system of claim 18, wherein the system is assembled on a further board with at least one other product component.

20. A non-transitory computer-readable medium to store computer-readable code for fabrication of the apparatus of claim 1.

* * * * *